(12) United States Patent
Endo et al.

(10) Patent No.: US 8,311,598 B2
(45) Date of Patent: Nov. 13, 2012

(54) MOBILE TERMINAL APPARATUS

(75) Inventors: Isao Endo, Kanagawa (JP); Kazuhiro Kato, Tokyo (JP)

(73) Assignee: Sony Mobile Communications Japan, Inc., Tokyo (JP)

(*) Notice: Subject to any disclaimer, the term of this patent is extended or adjusted under 35 U.S.C. 154(b) by 255 days.

(21) Appl. No.: 12/662,062

(22) Filed: Mar. 30, 2010

(65) Prior Publication Data

US 2010/0267429 A1    Oct. 21, 2010

(30) Foreign Application Priority Data

Apr. 17, 2009   (JP) ................... 2009-100961

(51) Int. Cl.
*H04W 88/02* (2009.01)
(52) U.S. Cl. .............. 455/575.4; 455/575.1; 455/128; 455/347; 455/550.1; 455/186.2
(58) Field of Classification Search .............. None
See application file for complete search history.

(56) References Cited

U.S. PATENT DOCUMENTS

| | | | |
|---|---|---|---|
| 7,697,965 B2 * | 4/2010 | Li ..................... | 455/575.4 |
| 2008/0274776 A1 * | 11/2008 | Cho et al. ............. | 455/575.4 |
| 2009/0093285 A1 | 4/2009 | Weng et al. | |
| 2011/0188187 A1 * | 8/2011 | Barnett et al. ......... | 361/679.01 |

FOREIGN PATENT DOCUMENTS

| | | |
|---|---|---|
| EP | 1 988 691 A2 | 11/2008 |
| JP | 2005-167847 | 6/2005 |
| KR | 2007-0071462 A | 7/2007 |
| WO | WO-2009/017381 A2 | 2/2009 |

OTHER PUBLICATIONS

European Search Report issued Jul. 10, 2010 for corresponding European Application No. 10 15 7770.

* cited by examiner

*Primary Examiner* — Duc Nguyen
*Assistant Examiner* — Fanghwa Wang
(74) *Attorney, Agent, or Firm* — Rader Fishman & Grauer, PLLC

(57) ABSTRACT

A mobile terminal apparatus includes a first cabinet; a second cabinet; a slide holding mechanism for holding a first cabinet and a second cabinet slidable during a shift from an closed state to an open state; a keyboard held within the second cabinet, the keyboard being disposed movable in slide directions of the first cabinet and the second cabinet; a hook disposed at a retraction side end; a keyboard lock member including a projection and a notch engaged with the hook; and a sliding groove that is disposed in the first cabinet in the slide direction of the first cabinet to slide the projection. The keyboard is held within the second cabinet when the first cabinet and the second cabinet are placed in the closed state or the keyboard ejects from the second cabinet when the first cabinet and the second cabinet are placed in the open state.

12 Claims, 14 Drawing Sheets

MOBILE TERMINAL APPARATUS

BACKGROUND OF THE INVENTION

1. Field of the Invention

The present invention relates to a mobile terminal apparatus, having a first cabinet and second cabinet mutually sliding to enter an open state or closed state, that is preferably applied to portable devices such as, for example, a mobile phone, a PHS (Personal Handyphone System) phone, a PDA (Personal Digital Assistant) apparatus, a hand-held game machine, and a digital camera.

The present invention relates more particularly to a mobile terminal apparatus that allows a keyboard held within the second cabinet to eject and provide a larger input plane for easier input operation when the first cabinet and the second cabinet mutually slide to enter the open state or allows a display unit to have improved visibility by slanting the first body or the second body on which the display unit is disposed when the first body and the second body enter the open state.

2. Description of the Related Art

Japanese Unexamined Patent Application Publication No. 2005-167847 discloses a mobile communication terminal in which sliding operation is simplified. In this mobile communication terminal, a display cabinet having a display unit is disposed slidably on an operation cabinet having a button operation unit, and the display unit slides to shift to the exposure state in which the button operation unit is exposed or the hidden state in which the button operation unit is hidden by the display cabinet.

An antenna holding unit of the operation cabinet has a first compression coil spring and the display cabinet is urged by the urging force of the first compression coil spring in the direction in which the hidden state shifts to the exposure state, making the slide operation for shifting to the exposure state easier.

SUMMARY OF THE INVENTION

In the mobile communication terminal disclosed in Japanese Unexamined Patent Application Publication No. 2005-167847, however, even in the exposure state in which the button operation unit is exposed, substantially half parts of the display cabinet and the operation cabinet mutually overlap. Accordingly, the buttons of the button operation unit are disposed in an area approximately half the area of the operation cabinet. This causes the following problems.
1. Since the area of the button operation unit is small, the spacing between adjacent buttons of the button operation unit becomes narrow.
2. Since the area of the button operation unit is small, the size of buttons disposed on the button operation unit is limited.
3. Since the area of the button operation unit is small, the number of buttons disposed on the button operation unit is limited.

These problems may affect input operation.

It is desirable to provide a mobile terminal apparatus that expands the input operation plane of the keyboard and simplifies keyboard input operation in sliding operation type portable devices.

According to an embodiment of the present invention, there is provided a mobile terminal apparatus including a first cabinet; a second cabinet; a slide holding mechanism for holding a first cabinet and a second cabinet slidable during a shift from an closed state in which the first cabinet and the second cabinet substantially fully overlap one another to an open state in which a certain part of the first cabinet and a certain part of the second cabinet overlap one another; a keyboard held within the second cabinet, the keyboard being disposed movable in slide directions of the first cabinet and the second cabinet; a first urging member urging the keyboard in an ejection direction opposite to a direction in which the first cabinet moves when the first cabinet and the second cabinet are placed in the open state; a hook disposed at a retraction side end opposite to an ejection side end, which is an end in the ejection direction of the keyboard; a keyboard lock member including a projection projecting from a sliding contact surface of the second cabinet, the sliding contact surface being in sliding contact with the first cabinet, and a notch engaged with the hook, the keyboard lock member being disposed on the second cabinet movable only in a direction orthogonal to the slide direction of the second cabinet with the projection projecting from the sliding contact surface of the second cabinet; a second urging member urging the keyboard lock member in a direction in which the hook is engaged with the notch; a sliding groove that is disposed in the first cabinet in the slide direction of the first cabinet to slide the projection of the keyboard lock member, the sliding groove including a locking groove and a lock releasing groove communicating with the locking groove, the locking groove being used to move the keyboard lock member via the projection in a direction in which the notch of the keyboard lock member is engaged with the hook when the first cabinet and the second cabinet are placed in the closed state, the lock releasing groove being used to move the keyboard lock member via the projection in a direction in which the hook is removed from the notch of the keyboard lock member when the first cabinet and the second cabinet are placed in the open state.

According to an embodiment of the present invention, when the first cabinet and the second cabinet are placed in the closed state, the hook is engaged with the notch of the keyboard lock member, so that the keyboard is held within the second cabinet.

When the first cabinet and the second cabinet are placed in the open state, the hook is removed from the notch of the keyboard lock member, so that the first urging member urges the keyboard in the ejection direction and the keyboard ejects from the second body. This increases the input operation plane of the keyboard.

According to the embodiment of the present invention, since the input operation plane of the keyboard is enlarged, the spacing between adjacent keys on the keyboard can be increased and the input operation becomes easier.

In addition, since the input operation plane of the keyboard is enlarged, keys with a larger physical size can be disposed on the keyboard and input operation becomes easier.

Alternatively, since the input operation plane of the keyboard is enlarged, the number of keys that can be disposed on the keyboard increases.

DESCRIPTION OF THE PREFERRED EMBODIMENTS

The present invention is applicable to a sliding operation type mobile phone in which a first cabinet and a second cabinet slide and move to shift to an open state or closed state.

First Embodiment

[Structure of a Mobile Phone According to an Embodiment]

Figure 1:
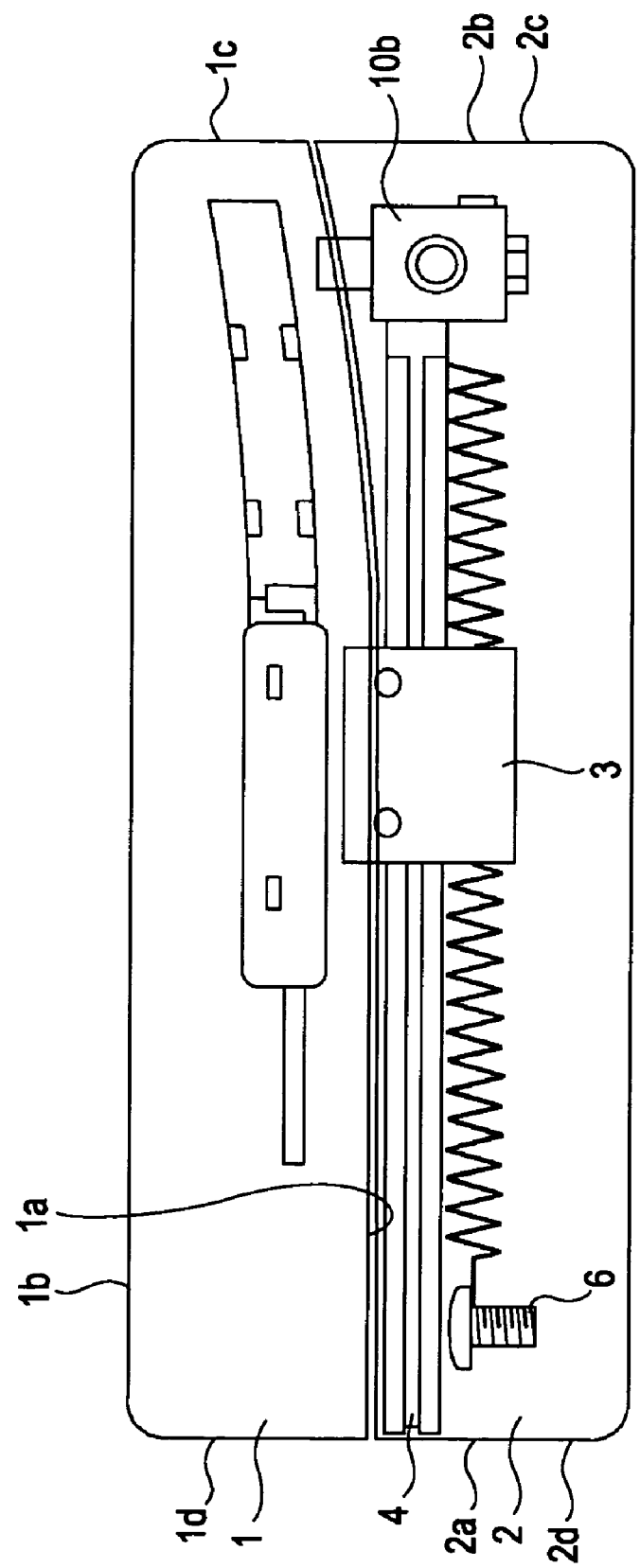
FIG. 1 is a diagram, seen from the right side, illustrating the substantial components when a mobile phone according to an embodiment of the present invention is placed in a closed state.
Figure 2:
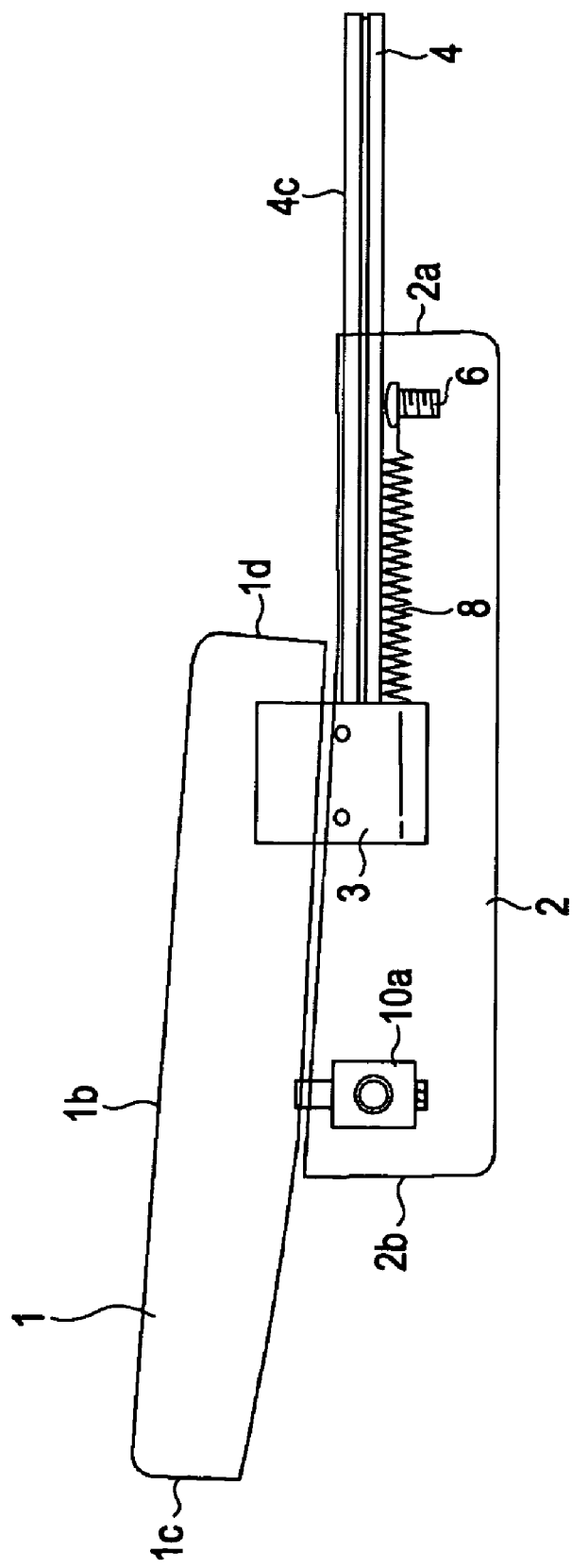
FIG. 2 is a drawing, seen from the left side, illustrating the substantial components when the mobile phone according to the embodiment is placed in an open state.
Figure 3:
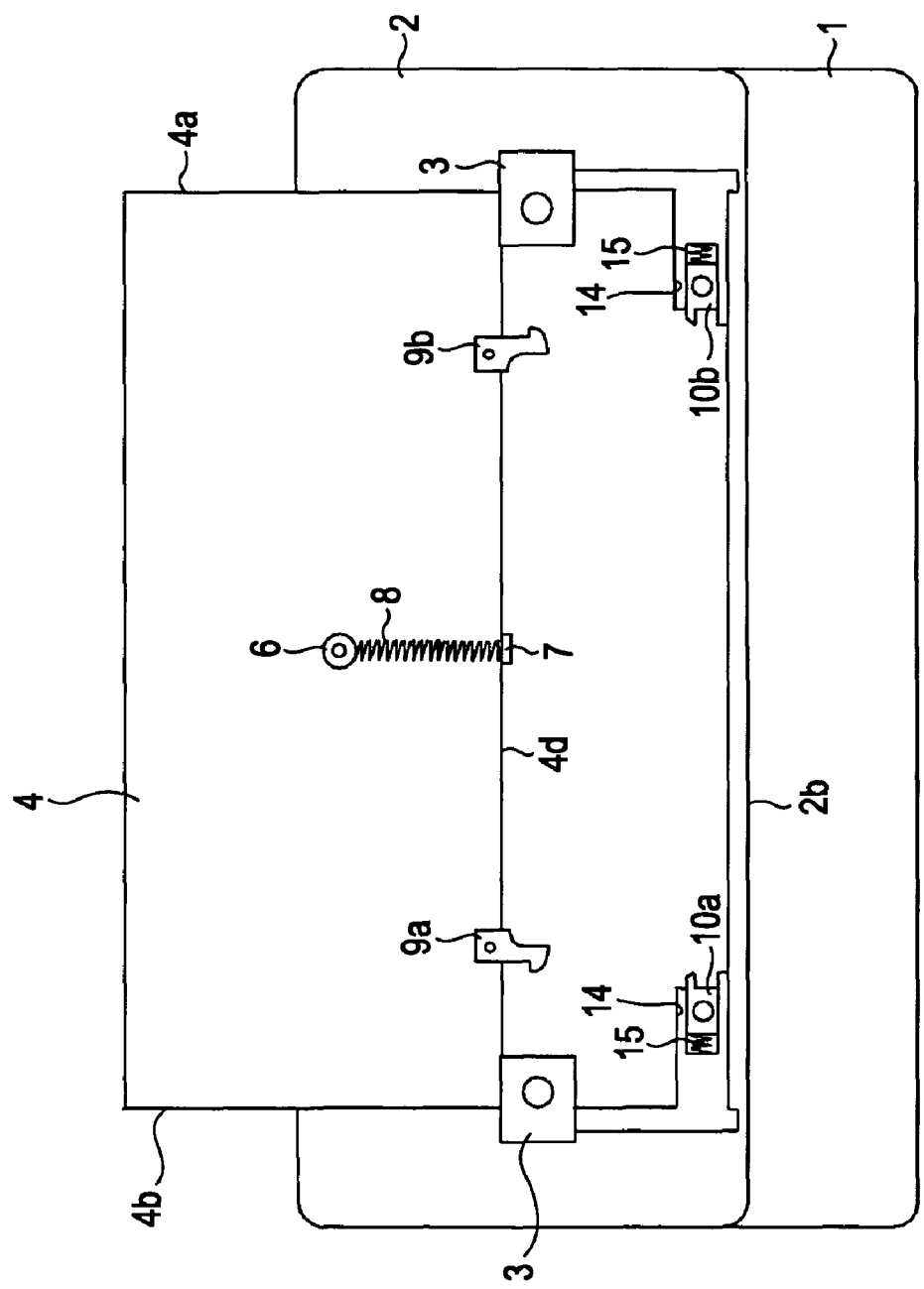
FIG. 3 is a drawing, seen from the bottom, illustrating the substantial components when the mobile phone according to the embodiment is placed in the open state.

FIG. 1 illustrates a mobile phone in the closed state according to an embodiment of the present invention. FIGS. 2 and 3 illustrate the mobile phone in an open state according to the embodiment. FIG. 1 is a diagram, seen from the right side, illustrating the substantial components when the mobile phone is placed in a closed state. FIG. 2 is a diagram, seen from the left side, illustrating the substantial components of the mobile phone in the open state. FIG. 3 is a diagram, seen from the bottom, illustrating the substantial components of the mobile phone in the open state, seen from the bottom.

As shown in FIGS. 1 to 3, this mobile phone includes a first cabinet 1, which is substantially rectangular-parallelepiped-shaped, a second cabinet 2, which is substantially rectangular-parallelepiped-shaped and has substantially the same size as in the first cabinet 1, and a slide holding mechanism 3, which holds the first cabinet and the second cabinet slidable during a shift from a closed state (see FIG. 1) in which the first cabinet and the second cabinet substantially fully overlap one another to an open state (see FIGS. 2 and 3) in which a part of the first cabinet and a part of the second cabinet overlap one another.

The first cabinet 1 has a display unit such as an electro luminescence display unit on a display plane 1b opposite to a sliding contact surface 1a that makes sliding contact with the second cabinet 2. Accordingly, in this mobile phone, the display unit is exposed regardless of whether the first cabinet and the second cabinet are placed in the open state or in the closed state.

A keyboard 4, which is substantially rectangular, is held within the second cabinet 2. More specifically, stepped machining is applied to ends 4a and 4b of the shorter sides of the keyboard 4. The second cabinet 2 has a keyboard insertion opening 5 into which the steps formed on the ends of the keyboard 4 fit. The keyboard 4 is held within the second body 2 with step-like ends 4a and 4b of the keyboard 4 inserted into the keyboard insertion opening 5, so that an operation plane 4c of the keyboard 4 is exposed.

Figure 4:
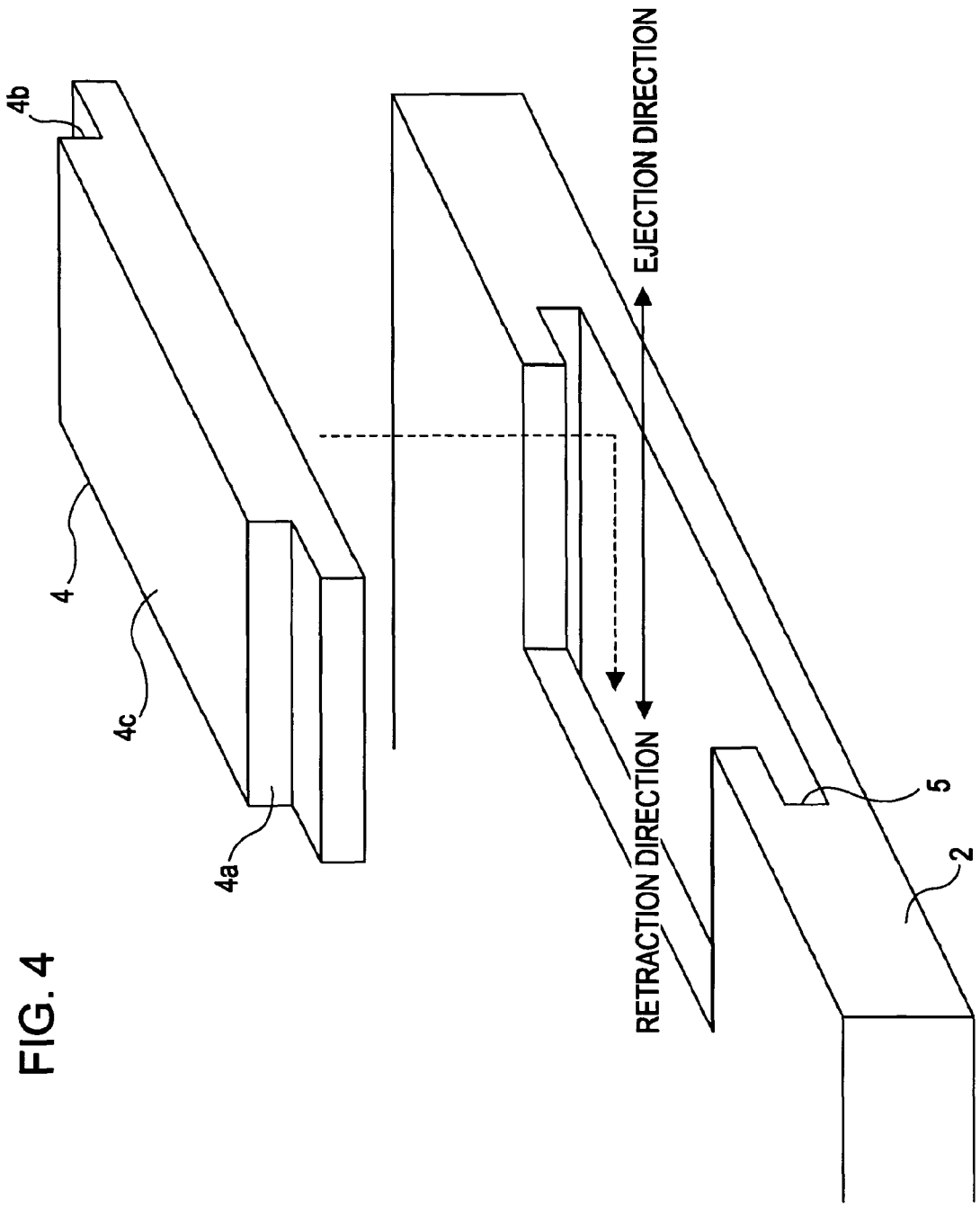
FIG. 4 illustrates a structure in which a keyboard is retracted into a second cabinet of the mobile phone according to the embodiment.

Since stepped machining is applied to the ends 4a and 4b of the shorter sides, when the keyboard 4 is retracted into the second cabinet 2 via the keyboard insertion opening 5, the keyboard 4 is allowed to move only in the directions in which the keyboard 4 is retracted and ejected (referred to below as a retraction direction and ejection direction, respectively), indicated by the arrows in FIG. 4, and prohibited to move in the thickness direction of the second cabinet 2.

One end of the keyboard 4 is secured by a screw 6 to the second cabinet 2 as shown FIG. 1 and the other end is urged in the ejection direction by a spring member 8 secured by a screw 7 to substantially the middle of the longer side at a retraction side end 4d of the keyboard 4 as shown in FIG. 3.

In addition, the keyboard 4 has a pair of hooks 9a and 9b projecting in the retraction direction from the longer side at the retraction side end 4d at positions closer to the shorter sides at the ends 4a and 4b of the keyboard 4 with the screw 7 centered, as shown in FIG. 3.

In addition, as shown in FIGS. 1 to 3, the second cabinet 2 has a pair of keyboard lock members 10a and 10b secured at positions corresponding to the hooks 9a and 9b along the longer side at the anti-ejection side end 2b opposite to the longer side at the ejection side end 2a of the keyboard 4.

The pair of hooks 9a and 9b are disposed on the keyboard 4 in this example, but only one hook or three or more hooks can be disposed on the keyboard 4. Similarly, the pair of keyboard lock members 10a and 10b are disposed on the second cabinet 2 in this example, but only one keyboard lock member or three or more keyboard lock members can be disposed on the second cabinet 2.

Figure 5:
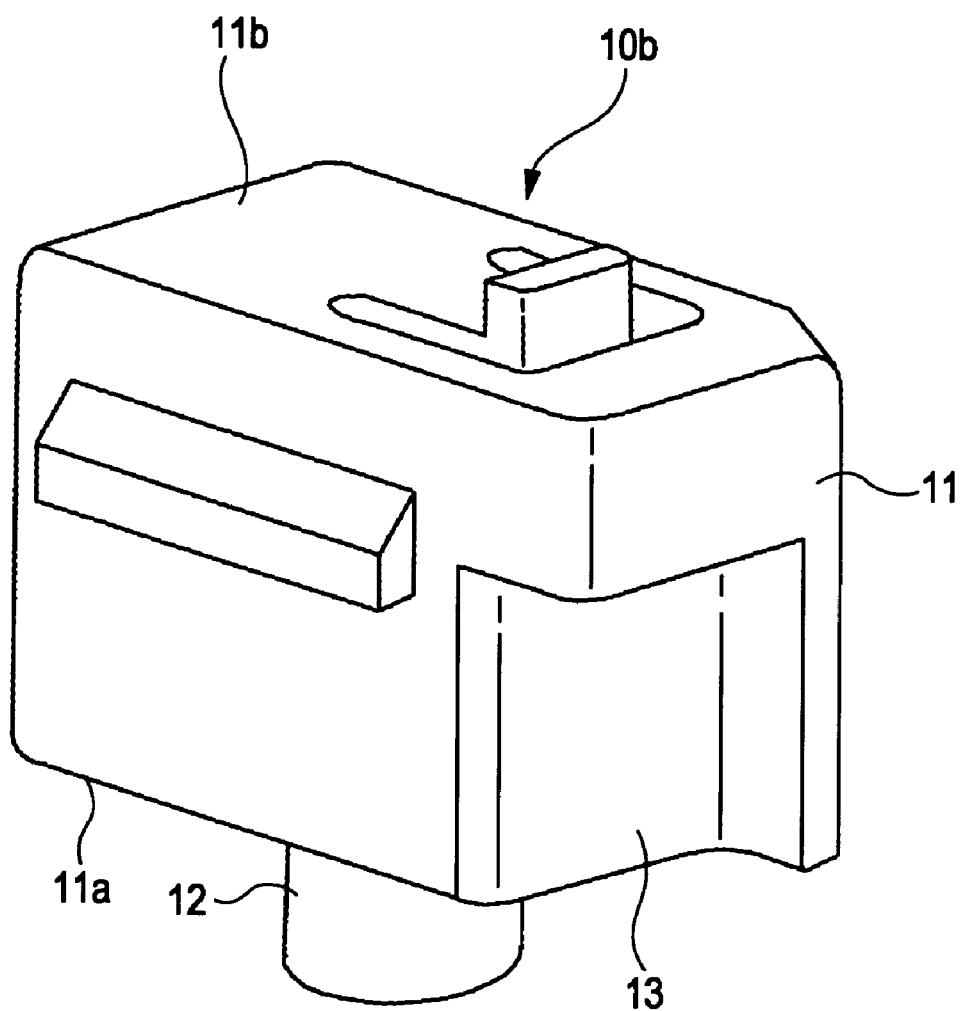
FIG. 5 is a perspective view illustrating a keyboard lock member disposed in the second cabinet of the mobile phone according to the embodiment.

FIG. 5 is a perspective view illustrating the keyboard lock member 10b. The keyboard lock member 10a also has the same structure, so the following description is applicable to the keyboard lock member 10a.

As shown in FIG. 5, the keyboard lock member 10b has a cabinet 11, which is substantially rectangular-parallelepiped-shaped, a projection 12, which projects from substantially the center of an upper surface 11a of a main body 11, a notch 13 with which the hook 9b is engaged.

Figure 6A:
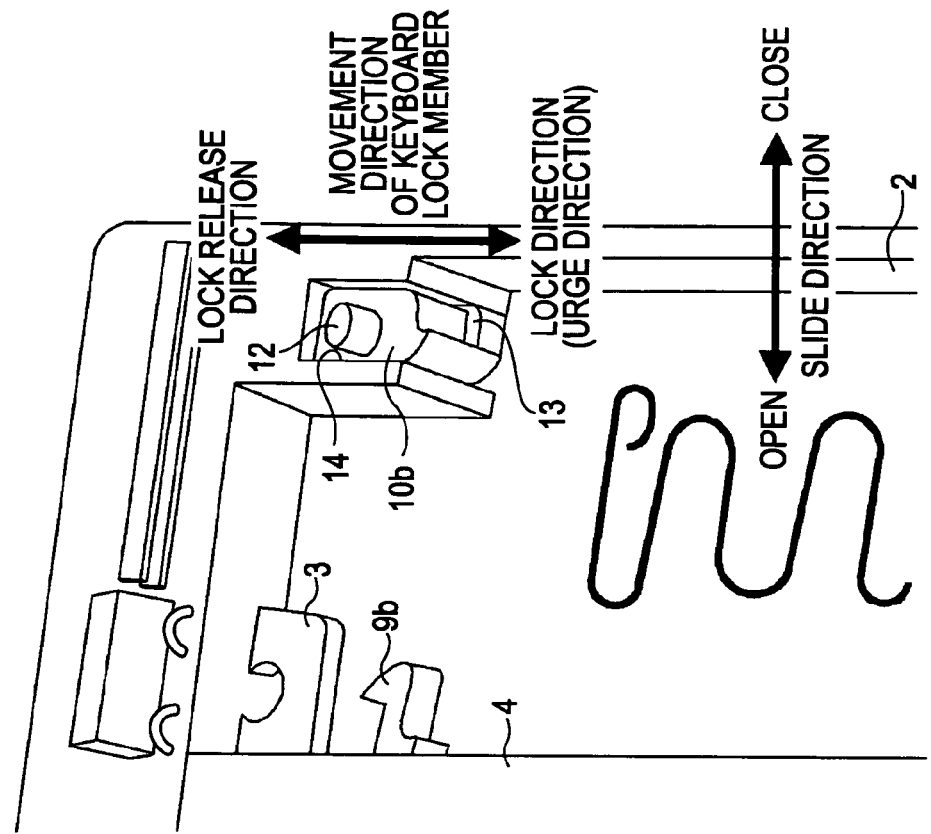
FIGS. 6A and 6B illustrate the installation of the keyboard lock member in the second cabinet of the mobile phone according to the embodiment.
Figure 6B:
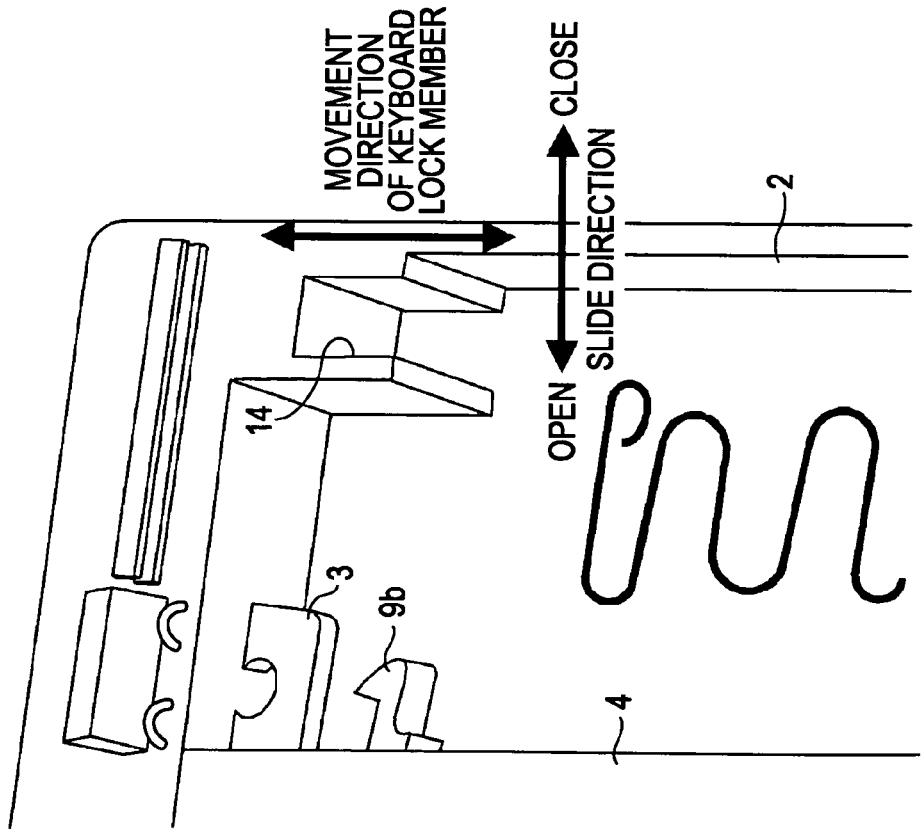

The second cabinet 2 has slide holding openings 14 shown in FIG. 6A in which the keyboard lock member 10a and 10b are disposed. The keyboard lock members 10b is inserted into the slide holding opening 14 from a bottom 11b of the cabinet 11 shown in FIG. 5 so as to move only in the direction orthogonal to the slide direction of the second cabinet 2 as shown in FIG. 6B.

That is, the keyboard lock member 10b is disposed in the second cabinet 2 movable only in a lock direction in which the notch 13 of the keyboard lock member 10b is engaged with the hook 9b disposed on the keyboard 4 and in a lock release direction in which the notch 13 of the keyboard lock member 10b is removed from the hook 9b disposed on the keyboard 4.

In addition, the keyboard lock member 10b is inserted into the slide holding opening 14 together with a spring member 15 as shown in FIG. 3. Accordingly, the keyboard lock member 10b is disposed on the second cabinet 2 so as to be urged in the direction in which the keyboard lock member 10b is engaged with the notch 9b.

Figure 7:
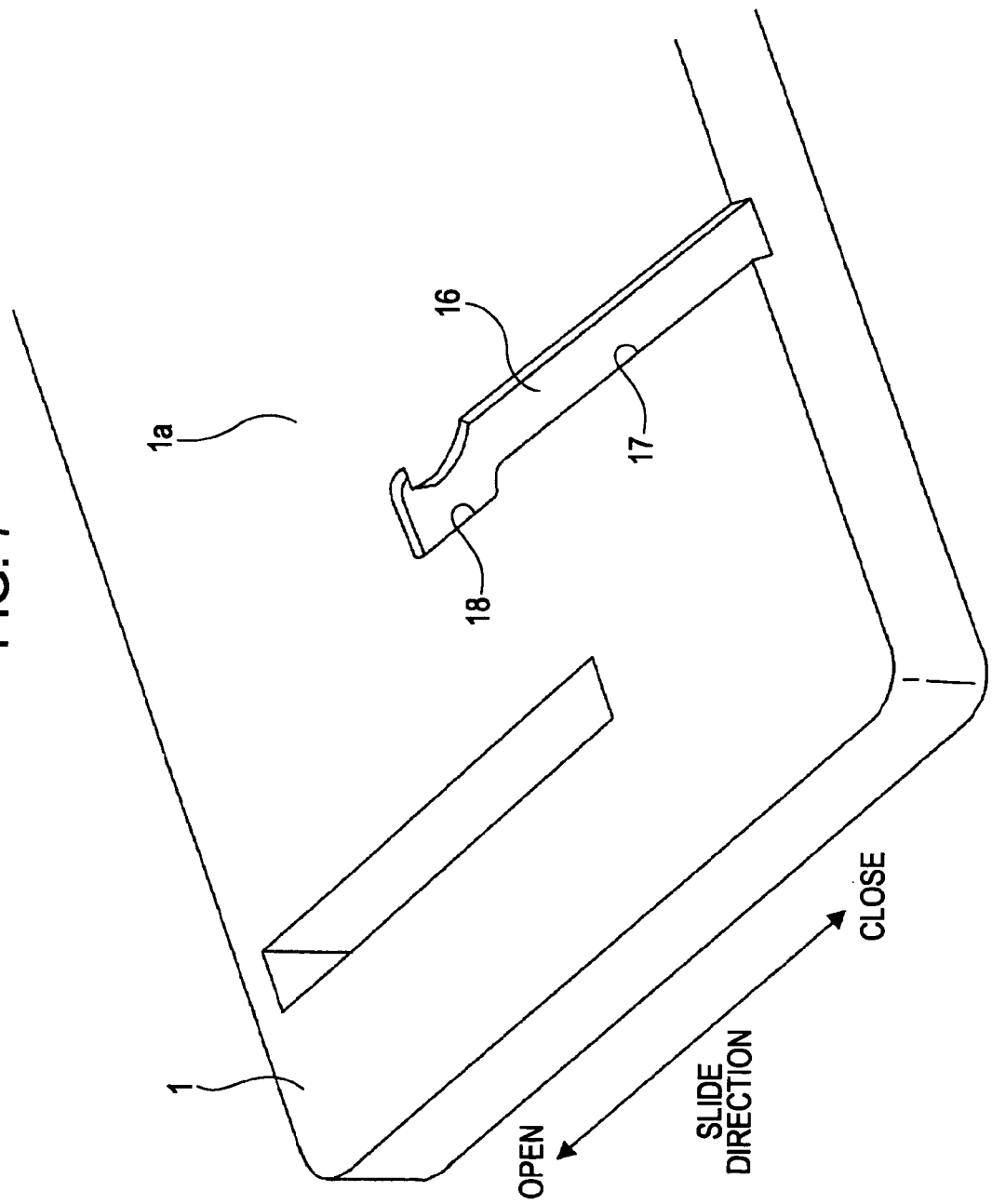
FIG. 7 illustrates a sliding groove disposed in a first cabinet of the mobile phone according to the embodiment.

Next, the sliding contact surface 1a of the first cabinet 1 that makes sliding contact with the second cabinet 2 has a sliding groove 16 in which the projection 12 of the keyboard lock member 10b slides, the sliding groove 16 being disposed along the slide direction of the first cabinet 1 as shown in FIG. 7. Another sliding groove 16 corresponds to the projection 12 of the keyboard lock member 10a is also disposed on the first cabinet 1. The structure will be described below.

The sliding groove 16 has a lock releasing groove 18, which moves the keyboard lock member 10b via the projection 12 in the direction (lock direction) in which the hook 9b is engaged with the notch 13 of the keyboard lock member 10b when the first cabinet 1 and the second cabinet 2 are placed in the closed state or in the direction (lock release direction) in which the notch 13 of the keyboard lock member 10b is removed from the hook 9b when the first cabinet 1 and the second cabinet 2 are placed in the open state.

As described later, when the first cabinet 1 and the second cabinet 2 are placed in the closed state, the keyboard lock members 10a and 10b are moved via the projections 12 along the sliding grooves 16 in the lock direction and the keyboard 4 is retracted into the second cabinet 2. When the first cabinet 1 and the second cabinet 2 are placed in the open state, the keyboard lock members 10a and 10b are moved via the projections 12 along the sliding grooves 16 in the lock release direction and the keyboard 44 held within the second cabinet 2 ejects from the second cabinet 2.

The diameter of the projections 12 is less than the width of the sliding grooves 16 so that the keyboard lock members 10a and 10b can move in the lock direction and the lock release direction, which are lateral directions of the sliding grooves 16, when the projections 12 of the keyboard lock members 10a and 10b are inserted into the sliding grooves 16. The reason why the keyboard lock members 10a and 10b are movable in the lock direction and the lock release direction is that there is a clearance between the projections 12 and the sliding grooves 16.

As shown in FIG. 1, in the first cabinet 1, the first cabinet 1 is tapered from the vicinity of substantially the center of the first cabinet 1 to a surface 1c away from the keyboard (referred to below as an off-keyboard side surface) so that the width of the off-keyboard side surface 1c is less than the width of a surface 1d close to the keyboard (referred to below as a keyboard side surface).

On the other hand, as shown in FIG. 1, the second cabinet 2 is thickened from the vicinity of substantially the center of the second cabinet 2 to a side 2c (referred to below as an anti-keyboard-ejection side surface) opposite to the keyboard ejection side surface 2d so that the width of the anti-keyboard-ejection side surface 2c is larger than the width of the keyboard ejection side surface 2d.

As described later, in this mobile phone, when the first cabinet 1 and the second cabinet 2 are place in the closed state, the sum of the width of the off-keyboard side surface 1c of the first cabinet 1 and the width of the anti-keyboard-ejection side surface 2c of the second cabinet 2 substantially equals the sum of the width of the keyboard side surface 1d of the first cabinet 1 and the width of the keyboard ejection side surface 2d of the second cabinet 2 due to slant machining applied to the first cabinet and the second cabinet.

When the first cabinet 1 and the second cabinet 2 are placed in the open state, however, the first cabinet 1 slides in a slanted attitude so that the highest point of the off-keyboard side surface 1c is higher than the highest point of the keyboard side surface 1d as shown in FIG. 2 due to the slant machining applied to the first cabinet 1 and the second cabinet 2 so as to improve the visibility of the display unit of the first cabinet 1.

[Sliding Operation of the Mobile Phone According to the Embodiment]

Next, the sliding operation of the mobile phone having this type of structure according to the embodiment will be described below.

[Sliding Operation for Switching from the Closed State to the Open State of the First Cabinet and the Second Cabinet]

Figure 8:
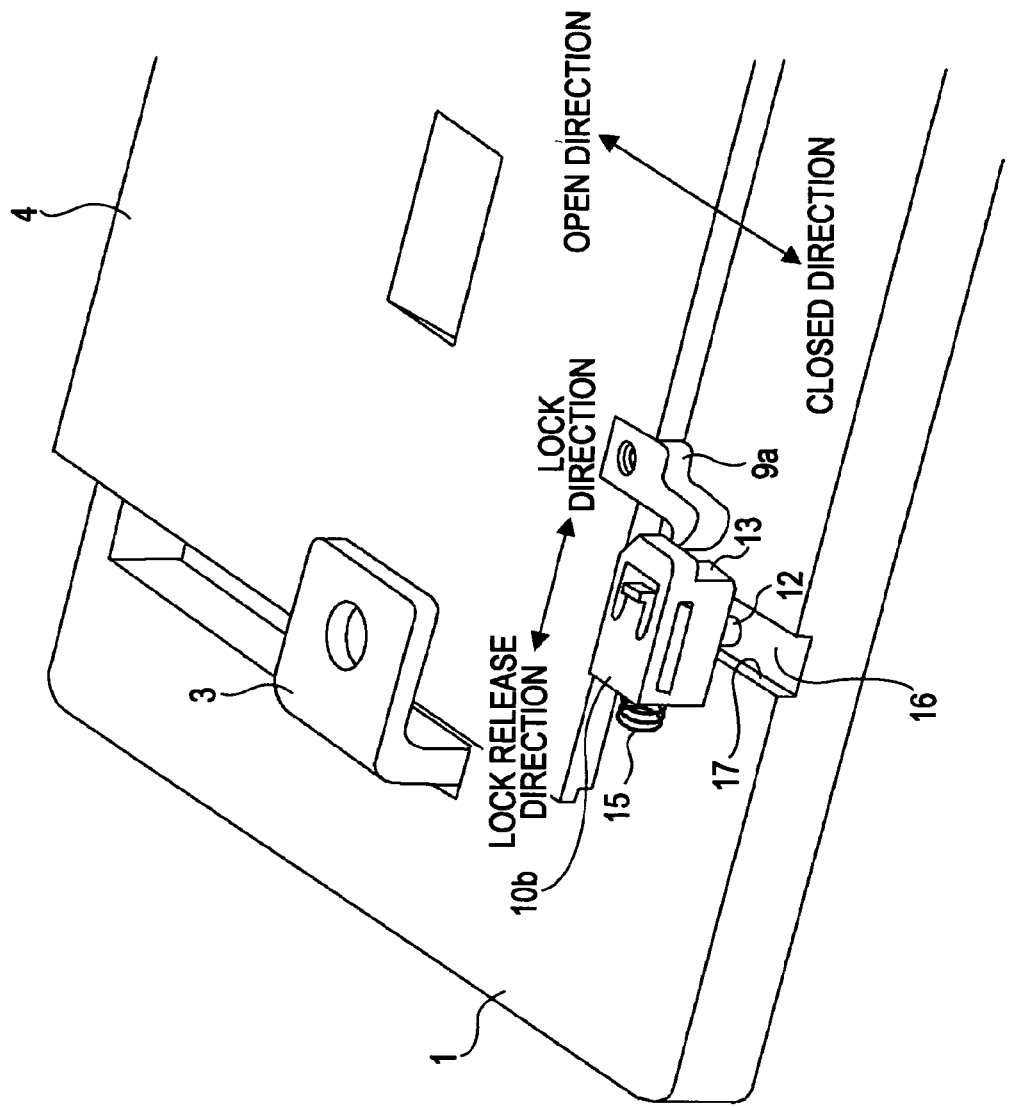
FIG. 8 illustrates the engagement of a hook of the keyboard and the keyboard lock member when the mobile phone according to the embodiment is placed in the closed state.
Figure 9:
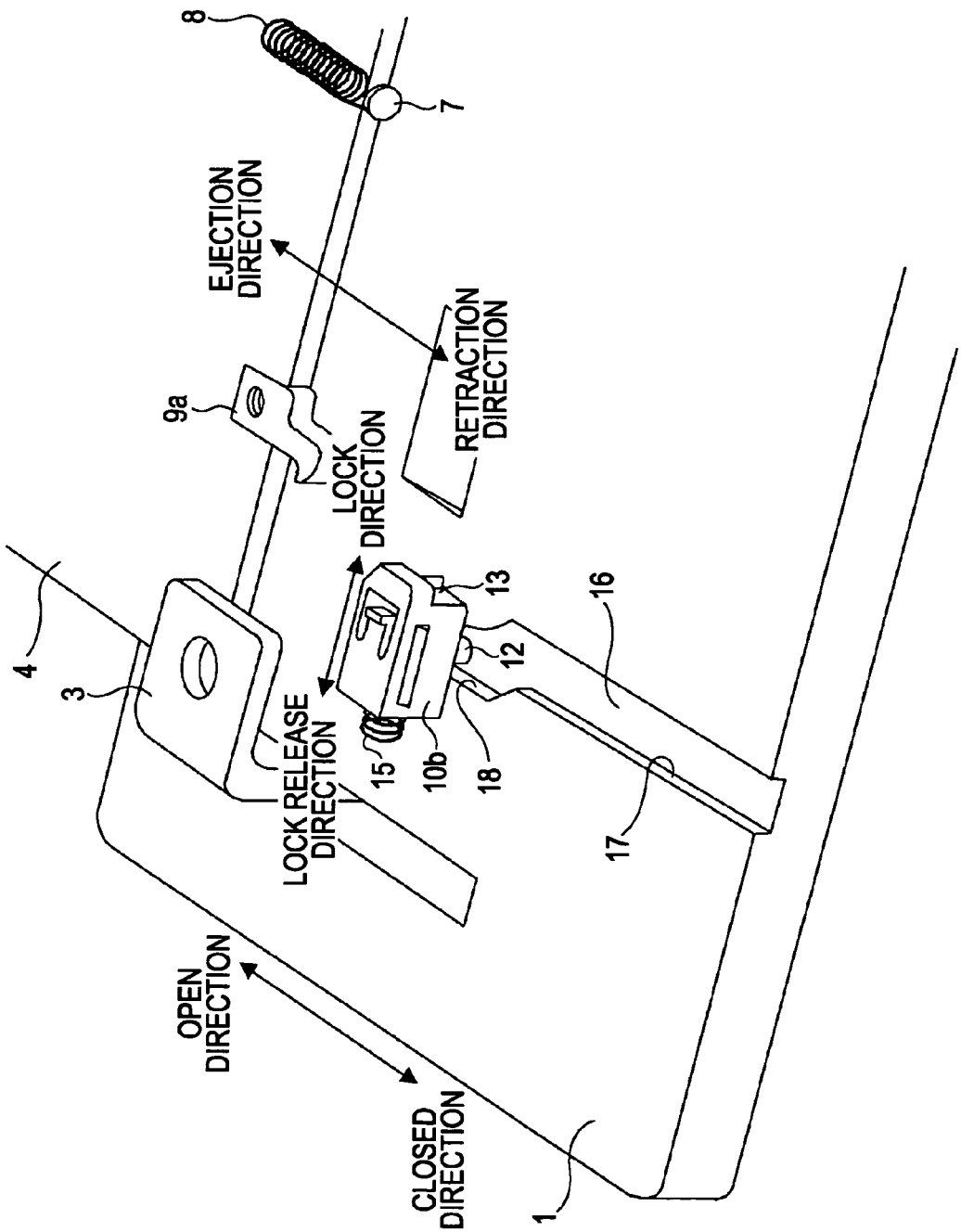
FIG. 9 illustrates the removal of a hook of the keyboard from the keyboard lock member when the mobile phone according to the embodiment is placed in the open state.

First, the sliding operation for placing the first cabinet and the second cabinet in the open state shown in FIG. 2 from the closed state shown in FIG. 1 will be described below. FIG. 8 illustrates only the substantial components when the first cabinet 1 and the second cabinet 2 are placed in the closed state. FIG. 9 illustrates only the substantial components when the first cabinet 1 and the second cabinet 2 are placed in the open state.

When the first cabinet 1 and the second cabinet 2 are placed in the closed state, the first cabinet 1 and the second cabinet 2 substantially fully overlap one another and the keyboard 4 is held within the second cabinet 2, as shown in FIG. 1. When the first cabinet 1 and the second cabinet 2 are placed in the closed state, the spring members 15 in FIG. 8 urges the keyboard lock members 10a and 10b in the lock direction, the projections 12 of the keyboard lock members 10a and 10b are moved in the locking groove 17 of the siding grooves 16 in the lock direction, and the keyboard lock members 10a and 10b are moved in the lock direction via the projections 12.

This causes the hooks 9a and 9b secured to keyboard 4 held within the second cabinet 2 in the closed state to be engaged with the notches 13 of the keyboard lock members 10a and 10b and the mobile phone to be placed in the closed state in which the first cabinet 1 and the second cabinet 2 substantially fully overlap one another with the keyboard 4 held within the second cabinet 2.

Next, in the closed state, when a force in the lateral direction that is opposite to the ejection direction of the keyboard 4 is applied to the first cabinet 1 and a force in the lateral direction that is aligned with the ejection direction of keyboard 4 is applied to the second cabinet 2, the first cabinet 1 and the second cabinet 2 move in different directions aligned with the lateral direction (the first cabinet 1 and the second cabinet 2 slide in the open direction), projections 12 move in the open direction along the locking grooves 17 of the sliding grooves 16 with the hooks 9a and 9b of keyboard 4 engaged with the keyboard lock members 10a and 10b.

When the first cabinet 1 and the second cabinet 2 are further slid and moved in the open direction, the projections 12 of the keyboard lock members 10a and 10b reach the lock releasing grooves 18 of the sliding grooves 16 shown in FIG. 9. The lock releasing grooves 18 have a shape that moves the keyboard lock members 10a and 10b in the lock release direction, so the keyboard lock members 10a and 10b move in the lock release direction along the lock releasing grooves 18 via the projections 12 against the urging force of the spring members 15.

When the keyboard lock members 10a and 10b move in the lock release direction, the hooks 9a and 9b attached to keyboard 4 are removed from the hooks 13 of the keyboard lock members 10a and 10b.

The keyboard 4 is urged by the spring member 8 in the ejection direction as described above. Accordingly, when the hooks 9a and 9b are removed from the notches 13 of the keyboard lock members 10a and 10b, the keyboard 4 is ejected by an urging force of the spring member 8 outside the second cabinet 2. This causes the mobile phone then to be placed in the open state shown in FIG. 2.

The keyboard 4 and the second cabinet 2 have a stopper (not shown) that stops the ejection of the keyboard 4 at a certain position.

As described above, in the mobile phone, the keyboard 4 held within the second cabinet 2 ejects outside the second cabinet 2 when the first cabinet 1 and the second cabinet 2 are placed in the open state. Accordingly, even though the first cabinet 1 and the second cabinet 2 overlap in the open state, the input operation plane substantially equal to the area of the second cabinet 2 can be obtained.

Since the input operation plane of the keyboard 4 is enlarged, the spacing between adjacent keys on the keyboard can be increased and the input operation becomes easier. In addition, since the input operation plane of the keyboard 4 is enlarged, keys with a larger physical size can be disposed on the keyboard 4 and the input operation becomes easier. Alternatively, since the input operation plane of the keyboard 4 is enlarged, the number of keys that can be disposed on the keyboard increases.

As described above, in the first cabinet 1, the first cabinet 1 is tapered from the vicinity of substantially the center of the first cabinet 1 to the off-keyboard side surface 1c so that the width of the off-keyboard side surface 1c is less than the width of the keyboard side surface 1d, as shown in FIG. 1.

As shown in FIG. 1, the second cabinet 2 is thickened from the vicinity of substantially the center of the second cabinet 2 to the anti-keyboard-ejection side surface 2c opposite to the keyboard ejection side surface 2d so that the width of the anti-keyboard-ejection side surface 2c is larger than the width of the keyboard ejection side surface 2d.

The slide holding mechanism 3 slides the first cabinet 1 and the second cabinet 2 along the above slopes in the open direction to slant the first cabinet 1 so that the highest point of the off-keyboard side surface 1c of the first cabinet 1 is higher than the highest point of the keyboard side surface 1d of the first cabinet 1 as shown in FIG. 2.

This enables the angle formed by the display plane b of the first cabinet 1 on which a display unit is disposed and the operation plane 4c of the keyboard 4 to become ergonomically proper and the display unit to have better visibility.

[Sliding Operation for Switching from the Open State to the Closed State of the First Cabinet and Second Cabinet]

Next, sliding operation for switching the state of the first cabinet 1 and second cabinet 2 from the open state shown in FIG. 2 to the closed state shown in FIG. 1 will be described below.

In this case, in the open state in FIG. 2, a force in a lateral direction and in the ejection direction of the keyboard 4 is applied to the first cabinet 1 and a force in the lateral direction and in a direction opposite to the ejection direction of keyboard 4 is applied to the keyboard 4 ejecting from the second cabinet 2. This causes the first cabinet 1 to move in the ejection direction of the keyboard 4 and the keyboard 4 to move the retraction direction in FIG. 9 against the urging force of the spring member 8.

When the first cabinet 1 and the second cabinet 2 are placed in the closed state from the open state, the first cabinet 1 moves in the ejection direction of the keyboard 4. So, the projections 12 of the keyboard lock members 10a and 10b move from the lock releasing grooves 18 of the sliding grooves 16 to the locking grooves 17 when the hooks 9a and 9b secured to the keyboard 4 reaches the positions of the keyboard lock members 10a and 10b disposed on the second cabinet 2, and the keyboard lock members 10a and 10b move in the lock direction via the projections 12.

This causes the hooks 9a and 9b that have reached the positions of the keyboard lock members 10a and 10b to be engaged with the notches 13 of the keyboard lock members 10a and 10b and the keyboard 4 is held within the second cabinet 2.

When a force in the lateral direction and in the ejection direction of the keyboard 4 is further applied to the first cabinet 1 with the keyboard 4 held within the second cabinet 2, the projections 12 of the keyboard lock members 10a and 10b move along the locking grooves 17 of the sliding grooves 16 with the hooks 9a and 9b of the keyboard 4 engaged with the notches 13 of the keyboard lock members 10a and 10b and the mobile phone is placed in the closed state in which the first cabinet 1 and the second cabinet 2 substantially fully overlap one another as shown in FIG. 1.

The slant machining is applied to the first cabinet 1 and the second cabinet 2, but the sum of the width of the off-keyboard side surface is of the first cabinet 1 and the width of the anti-keyboard-ejection side surface 2c of the second cabinet 2 substantially equals the sum of the width of the keyboard side surface 1d of the first cabinet 1 and the width of the keyboard ejection side surface 2d of the second cabinet 2. Accordingly, the entire shaped of the mobile phone is substantially rect-angle-parallelepiped-shaped in the closed state even though the slant machining is applied to the first cabinet 1 and the second cabinet 2.

EFFECT OF THE EMBODIMENT

As is clear from the above description, in the mobile phone according to the embodiment, when the first cabinet 1 and the second cabinet 2 are placed in the open state, the keyboard 4 held within the second cabinet 2 ejects externally. Accordingly, in the open state, the input operation plane that substantially equals the area of the second cabinet 2 can be obtained even though the first cabinet 1 and the second cabinet 2 mutually overlap.

Since the input operation plane of the keyboard 4 is enlarged, the distance between adjacent keys on the keyboard can be increased and input operation becomes easier. In addition, since the input operation plane of the keyboard 4 is enlarged, keys with a larger physical size can be disposed on the keyboard 4 and input operation becomes easier. Alternatively, since the input operation plane of the keyboard 4 is enlarged, the number of keys that can be disposed on the keyboard 4 increases.

The first cabinet 1 is tapered from the vicinity of substantially the center of the first cabinet 1 to the off-keyboard side surface 1c so that the width of the off-keyboard side surface 1c is less than the width of the keyboard side surface 1d. The second cabinet 2 is thickened from the vicinity of substantially the center of the second cabinet 2 to the anti-keyboard-ejection side surface 2c opposite to the keyboard ejection side surface 2d so that the width of the anti-keyboard-ejection side surface 2c of the second cabinet 2 is larger than the width of the keyboard ejection side surface 2d.

The slide holding mechanism 3 slides the first cabinet 1 and the second cabinet 2 along the slopes in the open direction to slant the first cabinet 1 so that the highest point of the off-keyboard side surface 1c of the first cabinet 1 is higher than the highest point of the keyboard side surface 1d of the first cabinet 1 as shown in FIG. 2.

This enables the angle formed by the display plane 1*b* of the first cabinet 1 on which the display unit is disposed and the operation plane 4*c* of the keyboard 4 to become ergonomically proper and the display unit to have better visibility.

Another Embodiment

Next, a mobile phone according to another embodiment of the present invention will be described below. In the mobile phone according to the other embodiment, the first cabinet 1 and the second cabinet 2 can be opened and closed smoothly in a semi-automatic manner and the first cabinet 1 can be slanted so that the highest point of the off-keyboard side surface 1*c* of the first cabinet 1 is higher than the highest point of the keyboard side surface 1*d* of the first cabinet 1 when the first cabinet 1 and the second cabinet 2 are placed in the open state in order to improve the visibility of the display unit.

The mobile phone according to the other embodiment differs only in this point from the mobile phone according to the embodiment. Accordingly, only the difference between the embodiments will be described later to omit duplicate description.

[Structure of the Mobile Phone According to the Other Embodiment]

Figure 10:
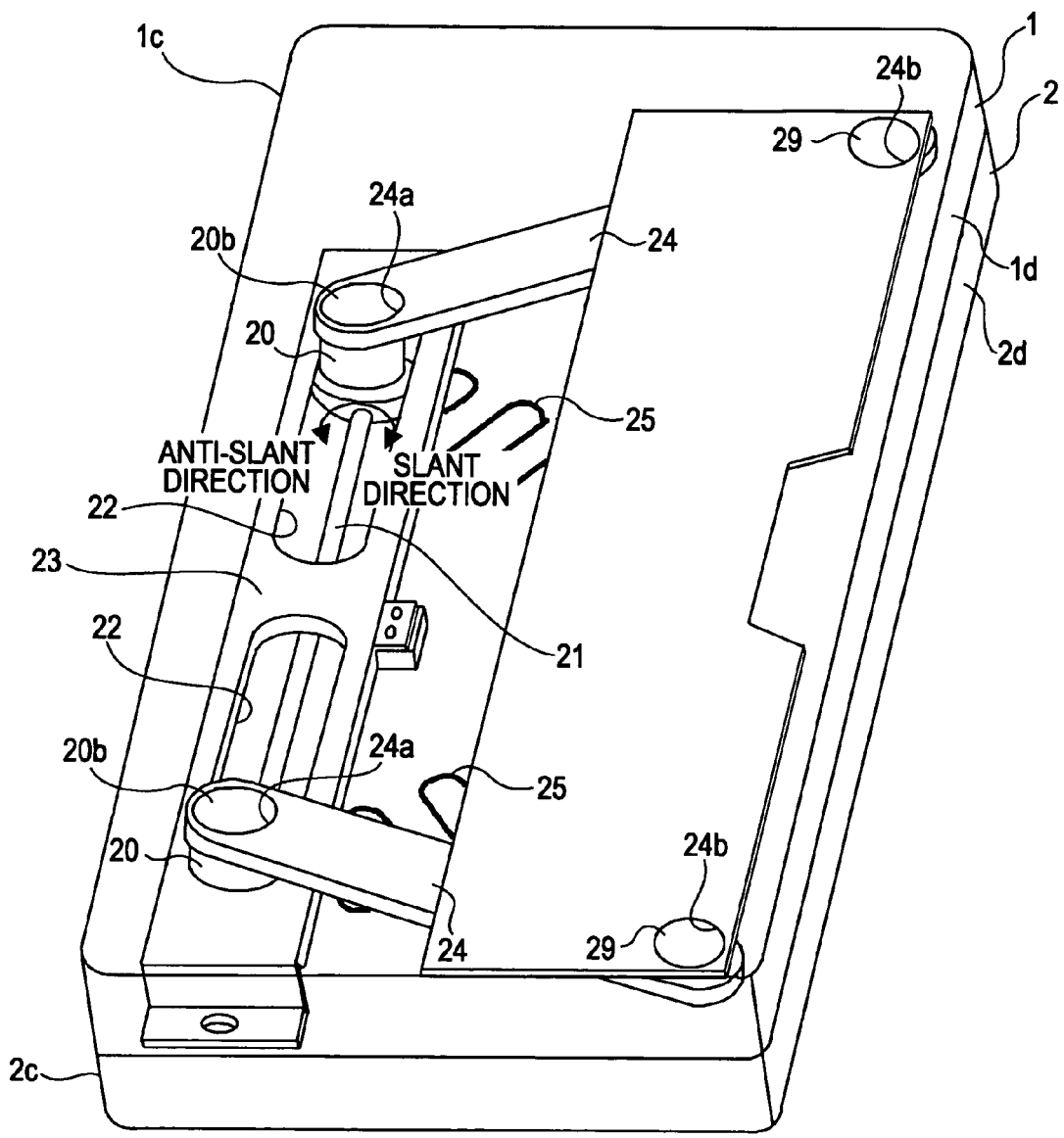
FIG. 10 is a drawing, seen from the first cabinet side, illustrating the substantial components when a mobile phone according to another embodiment of the present invention is placed in the closed state.
Figure 11:
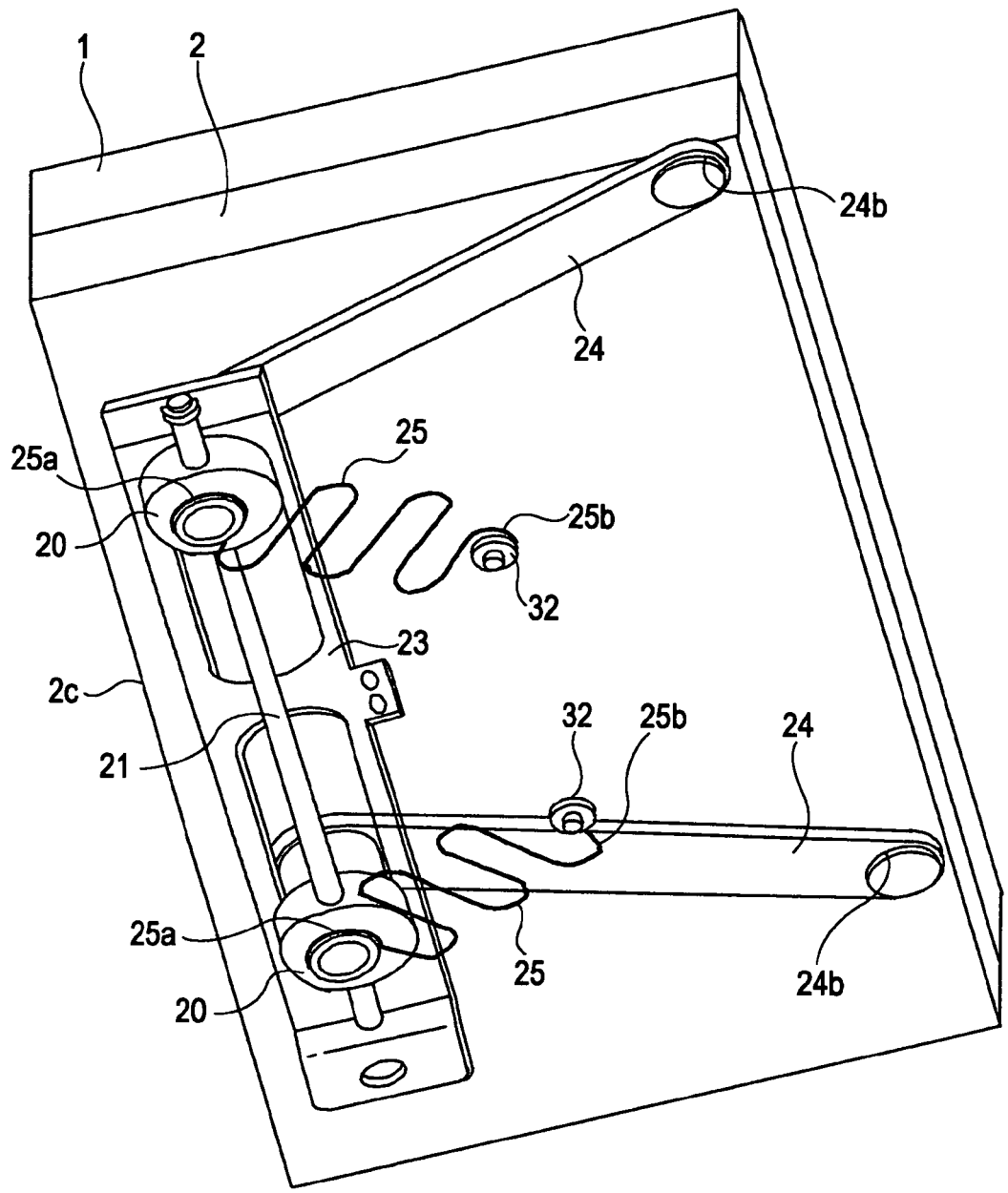
FIG. 11 is a drawing, seen from the second cabinet side, illustrating the substantial components when the mobile phone according to the other embodiment of the present invention is placed in the closed state.
Figure 12:
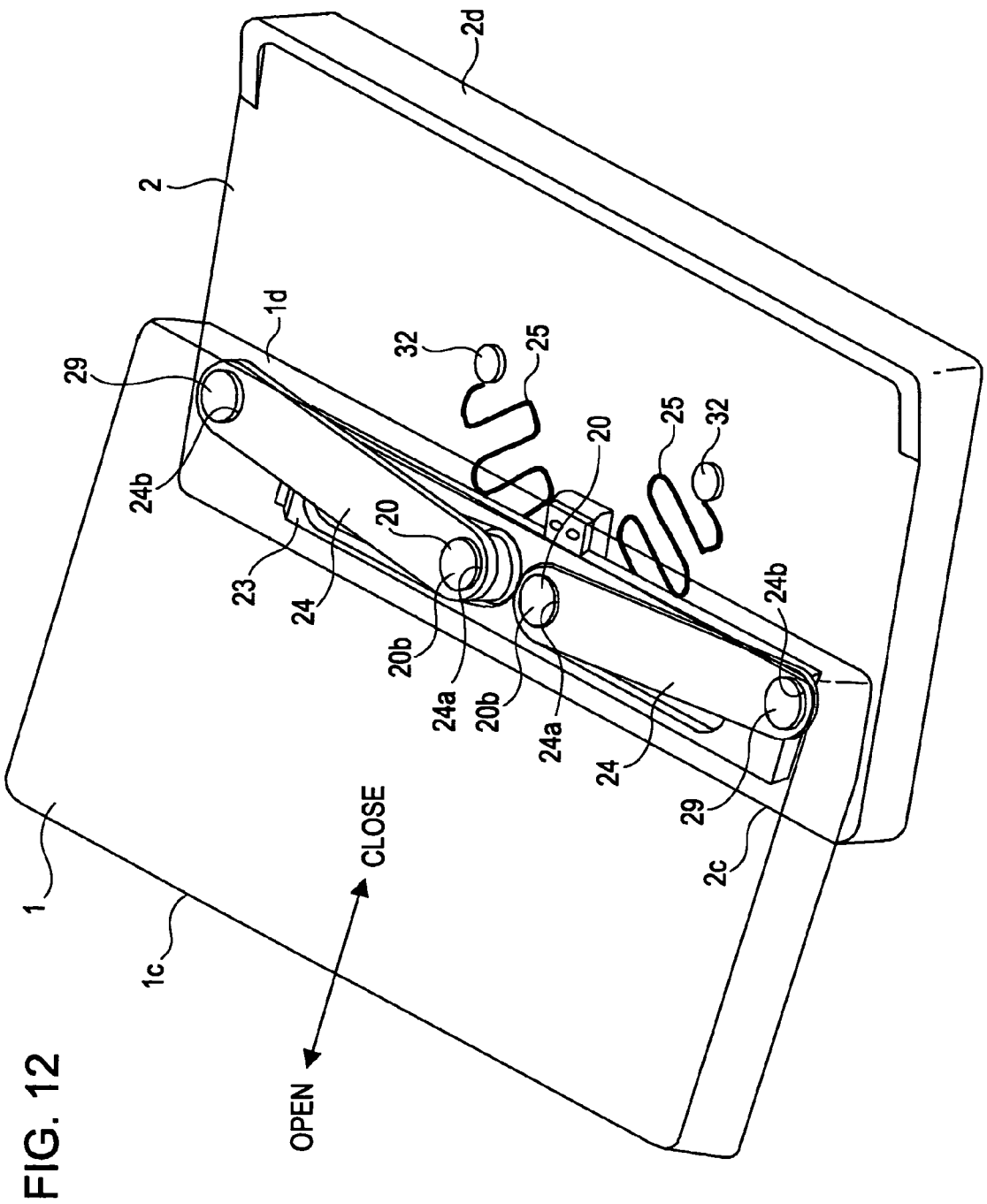
FIG. 12 is a drawing illustrating the substantial components, seen from the first cabinet side, when the mobile phone according to the other embodiment of the present invention is placed in the open state.

FIGS. 10 and 11 illustrate the substantial components when the mobile phone according to the other embodiment is placed in the closed state. FIG. 12 illustrates the substantial components when the mobile phone according to the other embodiment is placed in the open state. More specifically, FIG. 10 is a perspective view of the substantial components in the closed state, seen from the first cabinet side. FIG. 11 is a perspective view of the substantial components in the closed state, seen from the second cabinet side. FIG. 12 is a perspective view of the substantial components in the open state, seen from the first cabinet side.

In FIGS. 10 to 12, components such as the keyboard 4 and keyboard lock members 10*a* and 10*b*, which are described in the embodiment, are not shown so that the structure and operation of the mobile phone according to the other embodiment can easily be understood.

As shown in FIGS. 10 to 12, the mobile phone according to the other embodiment has a slide holding mechanism that includes a pair of slide pins 20, a guide shaft 21, which supports the slide pins 20 movably along the longitudinal direction and rotatably in the circumferential direction, guide plate 23, which has a pair of guide openings 22 with a length allowing the slide pins to move along the guide shaft 21 during switching between the closed state and the open state of the first cabinet 1 and the second cabinet 2, a pair of arm members 24, each of which has one end connected to the slide pin 20 and another end connected to the first cabinet 1, and a pair of spring members 25, each of which has one end connected to the slide pin 20 and another end connected to the first cabinet 2 and an urge direction changes.

Figure 13:
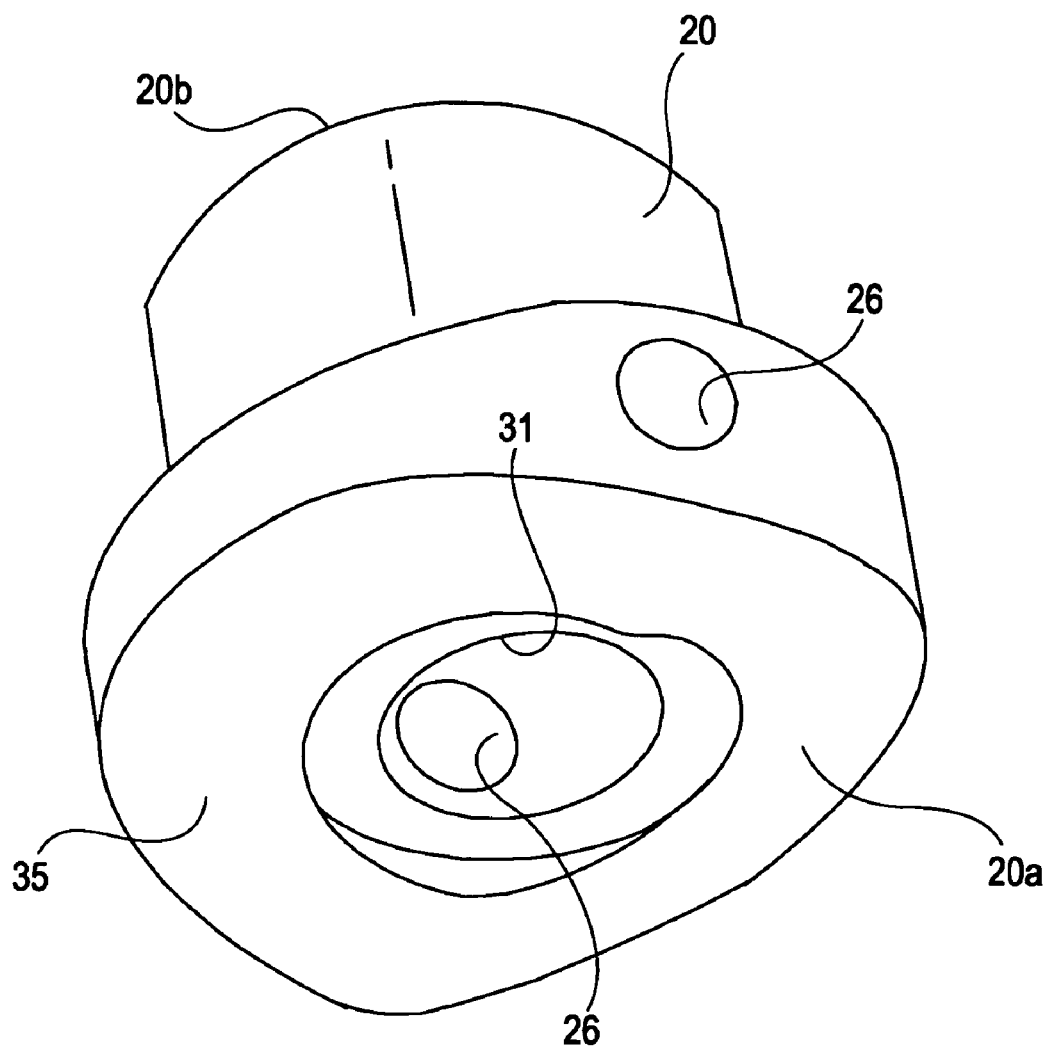
FIG. 13 is a perspective view illustrating a slide pin disposed in a slide holding mechanism of the mobile phone according to the other embodiment.

Each of the slide pins 20 is substantially cylindrical as shown in FIG. 13 and has a guide shaft insertion hole 26 passing through the side in the diameter direction. In addition, a spring stopper insertion hole 31 is disposed in a bottom 20*a* of each slide pins 20 in the direction orthogonal to the diameter direction of each slide pins 20.

As described later, in the mobile phone, the first cabinet 1 is slanted so that the highest point of the off-keyboard side surface 1*c* of the first cabinet 1 is higher than the highest point of the keyboard side surface 1*d* when the first cabinet 1 and the second cabinet 2 are placed in the open state. In this case, the slide pins 20 rotates in the circumferential direction of the guide shaft 21. The rotation brings the bottom 20*a* of each slide pin 20 into contact with the second cabinet 2, possibly preventing the first cabinet 1 from slanting. Accordingly, a slanted surface 35 to which slant machining corresponding to the slant of the first cabinet 1 is applied is disposed on the part on the bottom 20*a* of the slide pin 20 that makes contact with the second cabinet 2 when the first cabinet 1 and the second cabinet 2 are placed in the open state.

In this example, the slant machining corresponding to the slant of the first cabinet 1 is applied to the part on the bottom 20*a* of each slide pin 20 that is in contact with the second cabinet 2 when the first cabinet 1 and the second cabinet 2 are placed in the open state, but contact prevention holes (holes for relieving bottoms 20*a* of each slide pins 20 when the first cabinet 1 and the second cabinet 2 are placed in the open state) may be disposed in the bottom 20*a* of each slide pin 20 instead of the slant machining.

The guide shaft 21 is a cylindrical member with a diameter slightly smaller than the diameter of the guide shaft insertion holes 26 disposed in the slide pins 20. The guide shaft 21 is inserted into the guide shaft insertion hole 26 of each slide pin 20 as shown in FIGS. 10 to 12 so as to support each slide pin 20 movably along the guide shaft 21 and rotatably in the circumferential direction of the guide shaft 21.

Figure 14:
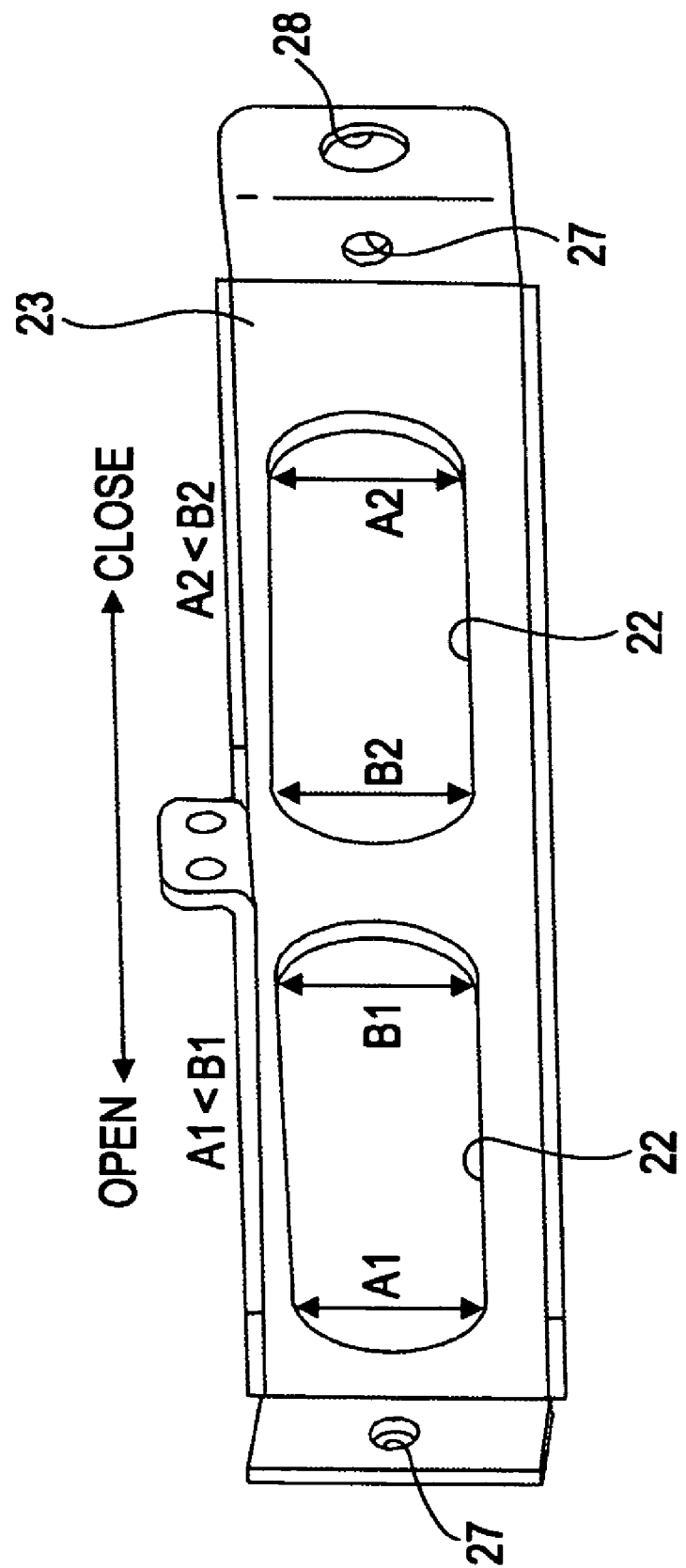
FIG. 14 is a perspective view illustrating a guide plate disposed in the slide holding mechanism of the mobile phone according to the other embodiment.

As shown in FIG. 14, the guide plate 23, which is rectangular in shape, has a pair of the guide openings 22, which are substantially oblong, along the longitudinal direction. The guide plate 23 also has a pair of guide shaft supporting holes 27 for supporting the guide shaft 21 along the longitudinal direction of the guide plate 23. One end and the other end of the guide shaft 21 that was inserted into the guide shaft insertion holes 26 of the slide pins 20 are inserted into the guide shaft supporting holes 27.

A screwing hole 28 for screwing the guide plate 23 is disposed in one or both ends on the shorter sides of the guide plate 23. The guide plate 23 is secured along the anti-keyboard-ejection side surface 2*c* of the second cabinet 2 with a screw inserted into the screwing hole 28 as shown in FIGS. 10 to 12.

The slide pins 20 are inserted into the guide openings 22 of the guide plate 23 as shown in FIGS. 10 to 12; the guide openings 22 guide the movement of the slide pins 22 along the guide shaft 21 to switch between the closed state and the open state of the first cabinet 1 and the second cabinet 2.

The slide pins 20 moves within the guide openings 22 of the guide plate 23 in the open direction and the closed direction as shown in FIG. 14 to switch between the closed state and the open state of the first cabinet 1 and the second cabinet 2. When the first cabinet 1 and the second cabinet 2 are placed in the open state, the slide pins 20 rotates in the circumferential direction of the guide shaft 21 and slants as described above. Since the guide plate 23 is secured to the second cabinet 2, if the slide pins 20 slant, the diameter of the slide pins 20 in the guide openings 22 of the guide plate 23 changes depending on whether the first cabinet 1 and the second cabinet 2 are placed in the closed state or in the open state.

That is, the diameter of the slide pins 20 in the guide openings 22 when the first cabinet 1 and the second cabinet 2 are placed in the open state in which the slide pins 20 slant is greater than the diameter of the slide pins 20 in the guide openings 22 when the first cabinet 1 and the second cabinet 2 are placed in the closed state in which the slide pins 20 do not slant.

Accordingly, as for the widths in the lateral direction of the guide openings 22 of the guide plate 23, the inside widths B1 and B2 in the lateral direction, in which the slide pins 20 are located when the first cabinet 1 and the second cabinet 2 are placed in the open state are larger than the outside widths A1 and A2 in the lateral direction, in which the slide pins 20 are located when the first cabinet 1 and the second cabinet 2 are placed in the closed state. In other words, the guide openings 22 of the guide plate 23 are formed to have mutually different inside and outside widths so that changes in the diameter of the slide pins 20 that are caused when the slide pins 20 are slanted can be accommodated.

The arm members 24 is strip-shaped as shown in FIGS. 10 to 12. The arm member 24 has a slide pin insertion hole 24a in the vicinity of one end, which is a through hole in the thickness direction and a cabinet fixing hole 24a in the vicinity of the other end, which is a through hole in the thickness direction.

The diameter of the slide pin insertion hole 24a disposed in the vicinity of one end of the arm member 24 is slightly larger than the diameter of an upper portion 20b opposite to a bottom 20a on which the guide shaft 21 of the slide pin 20 is disposed. The arm member 24 is connected to the slide pin 20 with the upper portion 20b of the slide pin 20 inserted into the slide pin insertion hole 24a so that the arm member 24 can rotate in the circumferential direction the slide pin 20.

A fixing pin 29 with smooth a circumferential surface is inserted into the cabinet fixing hole 24b disposed in the vicinity of the other end of the arm member 24. The arm members 24 are secured to the vicinities of both corners of the first cabinet 1 in the closed direction via the fixing pins 29. The circumferential surface of the fixing pin 29 is smooth, so the arm members 24 can rotate in the circumferential direction of the fixing pins 29.

The spring member 25 is corrugated as shown in FIGS. 10 to 12, or meandering. As shown in FIG. 11, one end 25a of the spring member 25 is secured to each slide pin 20 with a spring stopper 30 inserted into the spring stopper insertion hole 31.

The other end 25b of the spring member 25 is secured to the second cabinet 2 by screw 32 as shown in FIGS. 11 and 12 so that the slide pins 20 are urged to increase the distance between the slide pins 20 when the first cabinet 1 and the second cabinet 2 are placed in the closed state.

The direction in which the slide pins 20 are urged by the spring member 25 changes depending on the open/close state of the first cabinet 1 and the second cabinet 2 as described below so that the first cabinet 1 and the second cabinet 2 can be opened and closed smoothly in a semi-automatic manner.

[Sliding Operation of the Mobile Phone According to the Other Embodiment]

Next, the sliding operation of the mobile phone according to the other embodiment will be described below.

[Sliding Operation for Switching from the Closed State to the Open State of the First Cabinet and the Second Cabinet]

First, the slide operation for placing the first cabinet 1 and the second cabinet 2 in the open state shown in FIG. 12 from the closed state shown in FIGS. 10 and 11 will be described below.

When the first cabinet 1 and the second cabinet 2 are placed in the closed state, the slide pins 20 are urged by the spring members 25 in the direction in which the distance between the slide pins 20 is increased. If a force in the open direction shown in FIG. 9 is applied to the first cabinet 1 and a force in the closed direction is applied to the second cabinet 2 in this state, the forces applied to the first cabinet 1 and the second cabinet 2 are transferred to the slide pins 20 via the arm members 24, thereby moving the slide pins 20 from the outside to the inside of the guide openings 22 of the guide plate 23 along the guide shaft 21. At the same time, the one end 25a of each spring member 25 connected to the slide pins 20 moves according to the motion of the slide pins 20.

Next, when the slide pins 20 is moved by the arm members 24 slightly inward from substantially the middle of the guide openings 22 of the guide plate 23 by further applying a force in the open direction to the first cabinet 1 and a force in the closed direction to the second cabinet 2, the direction in which the slide pins 20 is urged by the spring members 25 changes to a direction in which the distance between the slide pins 20 is reduced.

That is, the position of one end 25a of each of the spring members 25 connected to the slide pins 20 moves according to the motion of the slide pins 20, so the direction urged by the spring members 25 in which the distance between the slide pins 20 is increased when the first cabinet 1 and the second cabinet 2 are placed in the closed state changes to the direction in which the distance between the slide pins 20 is reduced when the slide pins 20 move slightly inward from substantially the middle of the guide openings 22.

When the urge direction by the spring members 25 changes to a direction in which the distance between the slide pins 20 is reduced, the slide pins 20 are urged by the spring members 25 toward the inside of the guide openings 22 and the slide pins 20 move until they make contact with the inner side walls of the guide openings 22.

Accordingly, after the above force is applied to the first cabinet 1 and the second cabinet 2 until the first cabinet 1 and the second cabinet 2 to be substantially half opened, the urging force by spring members 25 causes the slide pins 20 to move until they make contact with the inner side walls of the guide openings 22, semi-automatically placing the first cabinet 1 and the second cabinet 2 in the open state shown in FIG. 12.

As described in the embodiment, the first cabinet 1 is tapered from the vicinity of substantially the center of the first cabinet 1 to the off-keyboard side surface 1c so that the width of the off-keyboard side surface 1c is less than the width of the keyboard side surface 1d. The second cabinet 2 is thickened from the vicinity of substantially the center of the second cabinet 2 to the anti-keyboard-ejection side surface 2c opposite to the keyboard ejection side surface 2d so that the width of the anti-keyboard-ejection-side surface 2c is larger than the width of the keyboard ejection side surface 2d. The guide plate 23 is screwed and secured along the anti-keyboard-ejection side surface 2c of the second cabinet 2.

Accordingly, when the first cabinet 1 and the second cabinet 2 are placed in the open state shown in FIG. 12, the keyboard side surface 1d of the first cabinet 1 comes closest to the anti-keyboard-ejection side surface 2c of the second cabinet 2 and the first cabinet 1 is slanted so that the highest point of the off-keyboard side surface 1c is higher than the highest point of the keyboard side surface 1d. Accordingly, a force that slants the first cabinet 1 upward is applied to the slide pins 20 via the arm members 24.

The slide pins 20 rotates in the slant direction shown in FIG. 10 along the circumference of the guide shaft 21 when receiving the force that slants the first cabinet 1 via the arm members 24. The slanted surfaces 35 on the bottoms 20a of the slide pins 20 prevent the bottoms 20a from making contact with the second cabinet 2 when the slide pins 20 rotate in the slant direction.

When the slide pins 20 rotate in the slant direction, the diameter of the slide pins 20 relative to the guide openings 22 of the guide plate 23 increases. As described with reference to FIG. 14, the inside widths B1 and B2, in which the slide pins 20 are located, in the lateral direction of the guide openings 22 of the guide plate 23 when the first cabinet 1 and the second cabinet 2 are placed in the open state are larger than the outside widths A1 and A2, in which the slide pins 20 are located, in the lateral direction of the guide openings 22 of the guide plate 23 when the first cabinet 1 and the second cabinet 2 are placed in the closed state. The guide plate 23 accommodates changes in the diameter of the slide pins 20 that are caused when the slide pins 20 are slanted. This enables the slide pins 20 to rotate in the slant direction smoothly when the first cabinet 1 and the second cabinet 2 are placed in the open state.

The functions of the slide pins 20 and the guide plate 23 allow the mobile phone according to the other embodiment to place the first cabinet 1 and the second cabinet 2 smoothly in the open state in FIG. 12 in a semi-automatic manner.

The first cabinet 1 is slanted so that the highest point of the off-keyboard side surface 1c is higher than the highest point of the keyboard side surface 1d when the first cabinet 1 and the second cabinet 2 are placed in the open state, so the angle formed by the display plane 1b of the first cabinet 1 on which the display unit is disposed and the operation plane of the keyboard becomes ergonomically appropriate so that the display unit has better visibility.

In the mobile phone according to the other embodiment, the guide plate 23 is screwed and secured along the anti-keyboard-ejection side surface 2c of the second cabinet 2, so the open state is entered with the keyboard side surface 1d of the first cabinet 1 coming closest to the anti-keyboard-ejection side surface 2c of the second cabinet 2. Accordingly, the slant of the first cabinet 1 in the open state becomes better than the slant of the first cabinet 1 of the mobile phone according to the embodiment and the display unit has better visibility.

In the mobile phone according to the other embodiment, the guide plate 23 is screwed and secured along the anti-keyboard-ejection side surface 2c of the second cabinet 2, it is possible to increase the exposed area of the keyboard disposed on the second cabinet that can be seen when the first cabinet 1 and the second cabinet 2 are placed in the open state even in the structure in which the keyboard disposed on the second cabinet 2 is exposed when the first cabinet 1 slides in the open direction without disposing the a mechanism for ejecting the keyboard 4.

Accordingly, the distance between adjacent keys on the keyboard disposed on the second cabinet 2 can be increased and input operation becomes easier. Keys with a larger physical size can be disposed on the keyboard and input operation becomes easier. Alternatively, since the input operation plane of the keyboard 4 is enlarged, the number of keys that can be disposed on the keyboard increases.

[Sliding Operation for Switching from the Open State to the Closed State of the First Cabinet and Second Cabinet]

Next, sliding operation for placing the first cabinet 1 and second cabinet 2 in the closed state shown in FIG. 10 from the open state shown in FIG. 12 will be described below.

When the first cabinet 1 and the second cabinet 2 are placed in the open state, the slide pins 20 are urged by the spring member 25 in the direction in which the distance between the slide pins 20 is reduced as described above. If a force in the closed direction shown in FIG. 12 is applied to the first cabinet 1 and a force in the open direction is applied to the second cabinet 2 in this state, the forces applied to the first cabinet 1 and the second cabinet 2 are transferred to the slide pins 20 via the arm members 24, thereby moving the slide pins 20 from the outside to the inside of the guide openings 22 of the guide plate 23 along the guide shaft 21. At the same time, the one end 25a of each of the spring members 25 connected to the slide pins 20 moves according to the motion of the slide pins 20.

Next, when the slide pins 20 is moved by the arm members 24 slightly outward from substantially the middle of the guide openings 22 of the guide plate 23 by further applying a force in the closed direction to the first cabinet 1 and a force in the open direction to the second cabinet 2, the direction in which the slide pins 20 is urged by the spring members 25 changes to a direction in which the distance between the slide pins 20 is increased.

That is, the position of one end 25a of each of the spring members 25 connected to the slide pins 20 moves according to the motion of the slide pins 20, so the direction urged by the spring members 25 in which the distance between the slide pins 20 is reduced when the first cabinet 1 and the second cabinet 2 are placed in the open state changes to the direction in which the distance between the slide pins 20 is increased when the slide pins 20 move slightly outward from substantially the middle of the guide openings 22.

When the urge direction by the spring members 25 changes to a direction in which the distance between the slide pins 20 is increased, the slide pins 20 are urged by the spring members 25 toward the outside of the guide openings 22 and the slide pins 20 move until they make contact with the outer side walls of the guide openings 22.

Accordingly, after the above force is applied to the first cabinet 1 and the second cabinet 2 until the first cabinet 1 and the second cabinet 2 to be substantially half closed, the urging force by spring members 25 causes the slide pins 20 to move until they make contact with the outer side walls of the guide openings 22, semi-automatically placing the first cabinet 1 and the second cabinet 2 in the closed state shown in FIGS. 10 and 11.

When the first cabinet 1 and the second cabinet 2 are placed in the closed state shown in FIG. 12, a force for restoring the slant of the first cabinet 1 is applied to the slide pins 20 via the arm members 24.

When the force for restoring the slant of the first cabinet 1 is applied to the slide pins 20 via the arm members 24, the slide pins 20 rotates in an anti-slant direction shown in FIG. 10 along the circumference of the guide shaft 21. This causes the diameter of the slide pins 20 in contact with the guide openings 22 of the guide plate 23 to return from the large diameter to the original one. The guide plate 23 holds the slide pins 20 with the original diameter in the outer sides of the guide openings 22 (in the outer sides with width A1 and A2 in FIG. 14).

This allows the mobile phone according to the other embodiment to smoothly shift to the closed state shown in FIGS. 10 and 11 in a semi-automatic manner.

The slant machining is applied to the first cabinet 1 and the second cabinet 2, but the sum of the width of the off-keyboard side surface 1c of the first cabinet 1 and the width of the anti-keyboard-ejection side surface 2c of the second cabinet 2 substantially equals the sum of the width of the keyboard side surface 1d of the first cabinet 1 and the width of the keyboard ejection side surface 2d of the second cabinet 2. Accordingly, the entire shaped of the mobile phone is substantially a rectangle parallelepiped in the closed state regardless of the slant machining applied to the first cabinet 1 and the second cabinet 2.

EFFECT OF THE OTHER EMBODIMENT

As is clear from the above description, the slide holding mechanism of the mobile phone according to the other embodiment has a pair of substantially cylindrical slide pins 20 each having the guide shaft insertion hole 26, which passes through the side of each slide pin 20, and the guide shaft 21, which is inserted into the guide shaft insertion holes 26 to support the slide pins 20 movably in the longitudinal direction and rotatably in the circumferential direction.

In addition, the slide holding mechanism includes the guide plate 23 having a pair of guide openings 22, which are disposed on the second cabinet 2, receives the slide pins 20, and has a length allowing the slide pins 20 to move along the guide shaft 21 for switching between the closed state and the open state of the first cabinet 1 and the second cabinet 2, and a pair of arm members 24, one end of each of which is connected to each of the slide pins 20 and another end of each of which is connected to the first cabinet 1 so as to movably support the slide pins 20 in the longitudinal direction of the guide shaft 21, rotatably support the slide pins 20 in the circumferential direction of the guide shaft 21.

The slide mechanism also has a pair of spring members 25, each of which has one end connected to one of the slide pins 20 and the other end connected to the second cabinet 2, urges the slide pins in an urge direction in which a distance between the slide pins 20 is increased when the first cabinet 1 and the second cabinet 2 are placed in the closed state, in which the urge direction is changed so as to urge the slide pins 20 in a direction in which the distance between the slide pins 20 is reduced because the position of the one end connected to the one of the slide pins 20 is moved as the one of the slide pins 20 is moved by one of the arm members 24 in the direction in which the distance between the slide pins 20 is reduced when the first cabinet 1 and the second cabinet 2 are placed in the open state from the closed state, in which the urge direction is changed so as to urge the slide pins 20 in a direction in which the distance between the slide pins 20 is increased because the position of the one end connected to the one of the slide pins 20 is moved as the one of the slide pins 20 is moved by the one of the arm members 24 in the direction in which the distance between the slide pins 20 is increased when the first cabinet 1 and the second cabinet 2 are placed in the closed state from the open state.

This allows the first cabinet 1 and the second cabinet 2 to be smoothly placed in the open state in a semi-automatic manner when the first cabinet 1 and the second cabinet 2 are placed in the open state shown in FIG. 12.

When the first cabinet 1 and the second cabinet 2 are placed in the open state, since the first cabinet 1 is slanted so that the width of the off-keyboard-side surface 1c of the first cabinet 1 is higher than the highest point of the keyboard side surface 1d of the first cabinet 1, the angle formed by the display plane 1b of the first cabinet 1 on which the display unit is disposed and the operation plane of the keyboard can become ergonomically proper and the display unit can have better visibility.

In addition, since the guide plate 23 is screwed and secured along the anti-keyboard-ejection side surface 2c of the second cabinet 2, the first cabinet 1 and the second cabinet 2 are placed in the open state when the keyboard side surface 1d of the first cabinet 1 comes closest to the anti-keyboard-ejection side surface 2c of the second cabinet 2. Accordingly, the slant of the first cabinet 1 in the open state becomes better than the slant of the first cabinet 1 of the mobile phone according to the embodiment and the display unit has better visibility.

Since the guide plate 23 is screwed and secured along the anti-keyboard-ejection side surface 2c of the second cabinet 2, it is possible to increase the exposed area of the keyboard 4 disposed on the second cabinet 2 that can be seen when the first cabinet 1 and the second cabinet 2 are placed in the open state even in the structure in which the keyboard 4 disposed on the second cabinet 2 is exposed when the first cabinet 1 slides in the open direction without disposing the a mechanism for ejecting the keyboard 4.

Accordingly, the distance between adjacent keys on the keyboard disposed on the second cabinet 2 can be increased and input operation becomes easier. Keys with a larger physical size can be disposed on the keyboard and input operation becomes easier. Alternatively, since the input operation plane of the keyboard 4 is enlarged, the number of keys that can be disposed on the keyboard increases.

[Modifications]

In the above descriptions of the embodiments, the present invention is applied to mobile phones, but the present invention is also applicable to PHS (Personal Handyphone System) phones, PDA (Personal Digital Assistant) apparatuses, handheld game machines, digital cameras, or other portable devices. The same effects can be obtained in any case.

The present application contains subject matter related to that disclosed in Japanese Priority Patent Application JP 2009-100961 filed in the Japan Patent Office on Apr. 17, 2009, the entire content of which is hereby incorporated by reference.

Finally, the above embodiments are examples of the present invention. Accordingly, it is clear that the present invention is not limited to the above embodiments and can be modified depending on the design or the like without departing from the technical spirit of the present invention.

What is claimed is:

1. A mobile terminal apparatus comprising:
   a first cabinet;
   a second cabinet;
   a slide holding mechanism for holding a first cabinet and a second cabinet slidable during a shift from an closed state in which the first cabinet and the second cabinet substantially fully overlap one another to an open state in which a certain part of the first cabinet and a certain part of the second cabinet overlap one another;
   a keyboard held within the second cabinet, the keyboard being disposed movable in slide directions of the first cabinet and the second cabinet;
   a first urging member urging the keyboard in an ejection direction opposite to a direction in which the first cabinet moves when the first cabinet and the second cabinet are placed in the open state;
   a hook disposed at a retraction side end opposite to an ejection side end, which is an end in the ejection direction of the keyboard;
   a keyboard lock member including a projection projecting from a sliding contact surface of the second cabinet, the sliding contact surface being in sliding contact with the first cabinet, and a notch engaged with the hook, the keyboard lock member being disposed on the second cabinet movable only in a direction orthogonal to the slide direction of the second cabinet with the projection projecting from the sliding contact surface of the second cabinet;
   a second urging member urging the keyboard lock member in a direction in which the notch is engaged with the hook;
   a sliding groove that is disposed in the first cabinet in the slide direction of the first cabinet to slide the projection of the keyboard lock member, the sliding groove including a locking groove and a lock releasing groove communicating with the locking groove, the locking groove being used to move the keyboard lock member via the projection in a direction in which the notch of the keyboard lock member is engaged with the hook when the first cabinet and the second cabinet are placed in the closed state and when the first cabinet and the second cabinet move from the closed state toward the open state, the lock releasing groove being used to move the keyboard lock member via the projection in a direction in which the hook is removed from the notch of the keyboard lock member when the first cabinet and the second cabinet are placed in or are adjacent to the open state;

wherein the hook is engaged with the notch of the keyboard lock member to hold the keyboard within the second cabinet when the first cabinet and the second cabinet are placed in the closed state or the hook is removed from the notch of the keyboard lock member when the first cabinet and the second cabinet are placed in or are adjacent to the open state and, when the first cabinet and the second cabinet are placed in or are adjacent to the open state, the keyboard is urged in the ejection direction by the first urging member to let the keyboard eject from the second cabinet.

2. The mobile terminal apparatus of claim 1, wherein the slide holding mechanism slants the first cabinet so that a highest point of an off-keyboard side surface, which is present in a direction in which the first cabinet moves, is higher than a highest point of a keyboard side surface, which is opposite to the off-keyboard side surface when the first cabinet and the second cabinet are placed in the open state.

3. The mobile terminal apparatus of claim 2, wherein:
the first cabinet is tapered from a vicinity of substantially a center of the first cabinet to the off-keyboard side surface so that a width of the off-keyboard side surface is less than a width of the keyboard side surface;
the second cabinet is thickened from a vicinity of substantially a center of the second cabinet to the anti-keyboard-ejection side surface opposite to the keyboard ejection side surface so that a width of the anti-keyboard-ejection side surface is larger than a width of the keyboard ejection side surface; and
the sum of the width of the off-keyboard side surface of the first cabinet and the width of the anti-keyboard-ejection side surface of the second cabinet substantially equals the sum of the width of the keyboard side surface of the first cabinet and the width of the keyboard ejection side surface of the second cabinet when the first cabinet and the second cabinet are placed in the closed state.

4. The mobile terminal apparatus of claim 2, wherein the slide holding mechanism includes:
a pair of substantially cylindrical slide pins each having a guide shaft insertion hole passing through a side of each slide pin;
a guide shaft that is inserted into the guide shaft insertion holes of the slide pins to support the slide pins movably in a longitudinal direction of the guide shaft and rotatably in a circumferential direction of the guide shaft;
a guide plate that is disposed on the second cabinet and has a pair of guide openings into which the slide pins are inserted, the guide openings having a length allowing the slide pins to move along the guide shaft to switch between the closed state and the open state of the first cabinet and the second cabinet;
a pair of arm members, each of which has an end connected to a respective one of the pair of slide pins and another end connected to the first cabinet so as to movably support the one of the slide pins in the longitudinal direction of the guide shaft and rotatably support the one of the slide pins in the circumferential direction of the guide shaft;
a pair of urging members, each of which has one end connected to one of the slide pins and another end connected to the second cabinet, urges the one of the slide pins in an urge direction in which a distance between the slide pins is increased when the first cabinet and the second cabinet are placed in the closed state, wherein the urge direction is changed so as to urge the one of the slide pins in a direction in which the distance between the slide pins is reduced because a position of the one end connected to the respective one of the slide pins is moved as the respective one of the slide pins is moved by one of the arm members in the direction in which the distance between the pair slide pins is reduced when the first cabinet and the second cabinet are placed in the open state from the closed state, wherein the urge direction is changed so as to urge the one of the slide pins in a direction in which the distance between the slide pins is increased because the position of the one end connected to the one of the slide pins is moved as the respective one of the slide pins is moved by the one of the arm members in the direction in which the distance between the slide pins is increased when the first cabinet and the second cabinet are placed in the closed state from the open state.

5. The mobile terminal apparatus of claim 4, wherein slant machining corresponding to the slant of the first cabinet is applied to a part of each of the slide pins that is in contact with the second cabinet to slant the first cabinet so that the highest point of the off-keyboard side surface is higher than the highest point of the keyboard side surface when the first cabinet and the second cabinet are in the open state.

6. The mobile terminal apparatus of claim 5, wherein each of the guide openings of the guide plate is gradually widened in width from an end with which each of the slide pins makes contact when the first cabinet and the second cabinet are placed in the closed state to an end with which each of the slide pins makes contact when the first cabinet and the second cabinet are placed in the open state.

7. The mobile terminal apparatus of claim 1, wherein there are at least two hooks, the hook being one of the at least two hooks, and the at least two hooks are spaced apart from one another at the retraction side end of the keyboard and there are at least two keyboard lock members, the keyboard lock member being one of the at least two keyboard lock members, and the at least two keyboard lock members are disposed in positions corresponding to positions of the hooks.

8. The mobile terminal apparatus of claim 2, wherein there are at least two hooks, the hook being one of the at least two hooks, and the at least two hooks are spaced apart from one another at the retraction side end of the keyboard and there are at least two keyboard lock members, the keyboard lock member being one of the at least two keyboard lock members, and the at least two keyboard lock members are disposed in positions corresponding to positions of the hooks.

9. The mobile terminal apparatus of claim 3, wherein there are at least two hooks, the hook being one of the at least two hooks, and the at least two hooks are spaced apart from one another at the retraction side end of the keyboard and there are at least two keyboard lock members, the keyboard lock member being one of the at least two keyboard lock members, and the at least two keyboard lock members are disposed in positions corresponding to positions of the hooks.

10. The mobile terminal apparatus of claim 4, wherein there are at least two hooks, the hook being one of the at least two hooks, and the at least two hooks are spaced apart from one another at the retraction side end of the keyboard and there are at least two keyboard lock members, the keyboard lock member being one of the at least two keyboard lock members, and the at least two keyboard lock members are disposed in positions corresponding to positions of the hooks.

11. The mobile terminal apparatus of claim 5, wherein there are at least two hooks, the hook being one of the at least two hooks, and the at least two hooks are spaced apart from one another at the retraction side end of the keyboard and there are at least two keyboard lock members, the keyboard lock member being one of the at least two keyboard lock members, and the at least two keyboard lock members are disposed in positions corresponding to positions of the hooks.

12. The mobile terminal apparatus of claim 6, wherein there are at least two hooks, the hook being one of the at least two hooks, and the at least two hooks are spaced apart from one another at the retraction side end of the keyboard and there are at least two keyboard lock members, the keyboard lock member being one of the at least two keyboard lock members, and the at least two keyboard lock members are disposed in positions corresponding to positions of the hooks.

* * * * *